United States Patent
Tan et al.

(10) Patent No.: US 12,242,341 B2
(45) Date of Patent: Mar. 4, 2025

(54) ERROR CORRECTION METHOD, MEMORY SYSTEM AND MEMORY CONTROLLER

(71) Applicant: YANGTZE MEMORY TECHNOLOGIES CO., LTD., Wuhan (CN)

(72) Inventors: Hua Tan, Wuhan (CN); Dili Wang, Wuhan (CN); Xuqing Jia, Wuhan (CN); Teng Zhou, Wuhan (CN)

(73) Assignee: Yangtze Memory Technologies Co., Ltd., Hubei (CN)

( * ) Notice: Subject to any disclaimer, the term of this patent is extended or adjusted under 35 U.S.C. 154(b) by 0 days.

(21) Appl. No.: 18/473,972

(22) Filed: Sep. 25, 2023

(65) Prior Publication Data
US 2025/0004877 A1 Jan. 2, 2025

(30) Foreign Application Priority Data

Jun. 30, 2023 (CN) .......................... 202310804798.4

(51) Int. Cl.
  *G06F 11/10* (2006.01)
(52) U.S. Cl.
  CPC ...... *G06F 11/1056* (2013.01); *G06F 11/1068* (2013.01); *G06F 11/108* (2013.01)
(58) Field of Classification Search
  None
  See application file for complete search history.

(56) References Cited

U.S. PATENT DOCUMENTS

| 9,564,239 B2* | 2/2017 | Cai ....................... G11C 16/28 |
| 2011/0231738 A1* | 9/2011 | Horisaki ............. G06F 11/1072 |
| | | 714/780 |
| 2012/0240007 A1* | 9/2012 | Barndt ............. H03M 13/3707 |
| | | 714/E11.03 |
| 2014/0185377 A1* | 7/2014 | Kim ....................... G11C 16/26 |
| | | 365/185.03 |
| 2017/0236562 A1* | 8/2017 | Varanasi .................. G11C 7/14 |
| | | 365/189.15 |

(Continued)

OTHER PUBLICATIONS

L. Shijun, Z. Xuecheng and W. Baocun, "Program and read methods with offset in quad-level-cell NAND design," 2017 International Conference on Electron Devices and Solid-State Circuits (EDSSC), Hsinchu, Taiwan, 2017, pp. 1-2, doi: 10.1109/EDSSC.2017. 8126461. (Year: 2017).*

*Primary Examiner* — Daniel F. McMahon
(74) *Attorney, Agent, or Firm* — Conley Rose, P.C.

(57) ABSTRACT

Examples provide for error correction. The error correction includes: obtaining first soft data according to first hard read data and cached second hard read data after hard decision decoding for the first hard read data fails, wherein the first hard read data is read according to a first hard read voltage, and the second hard read data is read according to a second hard read voltage before reading the first hard read data; and performing first soft decision decoding according to the first soft data and the first hard read data, or according to the first soft data and the second hard read data, wherein the first hard read voltage is one of a plurality of re-read voltages corresponding to a read command; and the second hard read voltage is an initial read voltage or a re-read voltage of the plurality of re-read voltages except the first hard read voltage.

20 Claims, 14 Drawing Sheets

(56) References Cited

U.S. PATENT DOCUMENTS

| | | | |
|---|---|---|---|
| 2019/0051360 A1* | 2/2019 | Lien | G11C 29/4401 |
| 2019/0108092 A1* | 4/2019 | Lee | G11C 11/5642 |
| 2021/0294698 A1* | 9/2021 | Khakifirooz | G11C 29/52 |
| 2021/0327530 A1* | 10/2021 | Yun | H03M 13/1111 |
| 2023/0187011 A1* | 6/2023 | Lee | G11C 29/022 |
| | | | 365/185.09 |
| 2024/0202068 A1* | 6/2024 | Kim | H03M 13/3707 |

\* cited by examiner

SELECTING, ACCORDING TO A FIRST NUMBER OF ERROR BITS INCLUDED IN THE FIRST HARD READ DATA AND A SECOND NUMBER OF ERROR BITS INCLUDED IN THE SECOND HARD READ DATA, WHETHER TO PERFORM THE FIRST SOFT DECISION DECODING ACCORDING TO THE FIRST SOFT DATA AND THE FIRST HARD READ DATA OR TO PERFORM THE FIRST SOFT DECISION DECODING ACCORDING TO THE FIRST SOFT DATA AND THE SECOND HARD READ DATA — S7021

FIG. 9

ERROR CORRECTION METHOD, MEMORY SYSTEM AND MEMORY CONTROLLER

CROSS-REFERENCE TO RELATED APPLICATIONS

The present application claims priority to Chinese Patent Application No. 2023108047984, which was filed Jun. 30, 2023, is titled "Error Correction Method, Memory System and Memory Controller," and is hereby incorporated herein by reference in its entirety.

TECHNICAL FIELD

The present disclosure relates to the technical field of memories, and particularly to an error correction method for a memory system, a memory system and a memory controller.

BACKGROUND

With the development of a memory technology, a 3D NAND Flash develops from a single level cell (SLC) capable of storing 1 bit of information and a double level cell (DLC) capable of storing 2 bits of information to a triple level cell (TLC) capable of storing 3 bits of information and even a quadruple level cell (QLC) capable of storing 4 bits of information, and a number of stack layers is increasingly more. For a memory device with increasingly more layers and stored bits, to enhance the reliability of data stored by the memory device, a low density parity code (LDPC) is usually employed for error correction during data reading. However, as the 3D NAND Flash becomes complex in structure and stores more data, error types included therein are more and more complex. A read rate may be affected by slow error correction methods that have low error correction speed and low efficiency.

SUMMARY

In the light of the above, examples of the present disclosure provide an error correction method for a memory system, a memory system, a memory controller, which can increase an error correction rate.

In a first aspect, examples of the present disclosure provide an error correction method for a memory system, comprising: obtaining a corresponding first soft data according to first hard read data and cached second hard read data after hard decision decoding for the first hard read data fails, wherein the first hard read data is read according to a first hard read voltage, and the second hard read data is read according to a second hard read voltage before reading the first hard read data; and performing first soft decision decoding according to the first soft data and the first hard read data, or performing first soft decision decoding according to the first soft data and the second hard read data, wherein the first hard read voltage is one of a plurality of re-read voltages with a certain offset from an initial read voltage, and the second hard read voltage is the initial read voltage or a re-read voltage of the plurality of re-read voltages except the first hard read voltage.

In the above examples, the method further comprises: caching the first hard read data; reading a third hard read data according to a third hard read voltage after the first soft decision decoding fails, and performing the hard decision decoding on the third hard read data; obtaining a corresponding second soft data according to the cached first hard read data and the third hard read data after the hard decision decoding for the third hard read data fails; and performing the first soft decision decoding according to the second soft data and the first hard read data, or performing the first soft decision decoding according to the second soft data and the third hard read data, wherein the third hard read voltage is one of the plurality of re-read voltages except the first hard read voltage and the second hard read voltage.

In the above examples, the method further comprises: finishing a first stage of error correction code (ECC) error correction if: the hard decision decoding is successful, the first soft decision decoding is successful, or a number of retries of hard read reaches a first set threshold.

In the above examples, the obtaining the corresponding first soft data according to the first hard read data and the cached second hard read data comprises: performing XOR operation on the first hard read data and the second hard read data to obtain the first soft data.

In the above examples, the method further comprises: selecting, according to a first number of error bits included in the first hard read data and a second number of error bits included in the second hard read data, whether to perform the first soft decision decoding according to the first soft data and the first hard read data or to perform the first soft decision decoding according to the first soft data and the second hard read data.

In the above examples, a number of error bits included in hard read data is measured using a syndrome weight value, and the greater the syndrome weight value is, the more the number of error bits included in the hard read data is; and the selecting, according to a first number of error bits included in the first hard read data and a second number of error bits included in the second hard read data, whether to perform the first soft decision decoding according to the first soft data and the first hard read data or to perform the first soft decision decoding according to the first soft data and the second hard read data comprises: obtaining a first syndrome weight value corresponding to the first hard read data; obtaining a second syndrome weight value corresponding to the second hard read data; comparing the first syndrome weight value corresponding to the first hard read data with the second syndrome weight value corresponding to the second hard read data; performing a first soft decision decoding according to the first soft data and the first hard read data when a comparison result comprises the first syndrome weight value being less than the second syndrome weight value; performing a first soft decision decoding according to the first soft data and the second hard read data when the comparison result comprises the first syndrome weight value being greater than the second syndrome weight value; and performing a first soft decision decoding according to the first soft data and the first hard read data, or performing a first soft decision decoding according to the first soft data and the second hard read data when the comparison result comprises the first syndrome weight value being equal to the second syndrome weight value.

In the above examples, the method further comprises: deleting the cached second hard read data after performing a first soft decision decoding according to the first soft data and the first hard read data or performing a first soft decision decoding according to the first soft data and the second hard read data; and deleting the cached first hard read data after performing the first soft decision decoding according to the second soft data and the first hard read data or performing the first soft decision decoding according to the second soft data and the third hard read data.

In the above examples, the method further comprises: performing a second stage of ECC error correction after the first stage of ECC error correction fails, wherein: the second stage of ECC error correction comprises: performing at least one second soft decision decoding.

In the above examples, the method further comprises: determining a group of soft read voltages, wherein the group of soft read voltages include an optimal read voltage and a plurality of soft re-read voltages with a certain offset relative to the optimal read voltage; and reading a fourth hard read data and a third soft data according to a soft read voltage of the group of soft read voltages, and performing the second soft decision decoding according to the fourth hard read data and the third soft data, wherein the second stage of ECC error correction is finished if: the second soft decision decoding is successful, or a number of retries of soft read reaches a second set threshold.

In the above examples, the method further comprises: performing a third stage of redundant array of independent NAND (RAIN) error correction after the second stage of ECC error correction fails.

In the above examples, the method further comprises: outputting indication information for characterizing error correction failure after the third stage of RAIN error correction fails.

In the above examples, the method further comprises: outputting read data successfully corrected if: the first stage of ECC error correction is successful, the second stage of ECC error correction is successful, or the third stage of RAIN error correction is successful.

In the above examples, a voltage interval between the read voltages of the group of soft read voltages is the same as a voltage interval between hard read voltages of a group of hard read voltages used by the hard decision decoding, wherein the group of hard read voltages include the initial read voltage and the plurality of re-read voltages.

In a second aspect, examples of the present disclosure further provide a memory system, comprising: a memory device configured to store data; a memory controller coupled with the memory device and configured to: obtain a corresponding first soft data according to first hard read data and cached second hard read data after hard decision decoding for the first hard read data fails, wherein the first hard read data is read according to a first hard read voltage, and the second hard read data is read according to a second hard read voltage before reading the first hard read data; perform first soft decision decoding according to the first soft data and the first hard read data, or performing first soft decision decoding according to the first soft data and the second hard read data, wherein the first hard read voltage is one of a plurality of re-read voltages with a certain offset from an initial read voltage, and the second hard read voltage is the initial read voltage or a re-read voltage of the plurality of re-read voltages except the first hard read voltage.

In the above examples, the memory controller comprises: a processor, a memory, a hard decoder and a soft decoder, wherein: the processor is configured to: read the first hard read data from the memory device according to the first hard read voltage; read the second hard read data according to the second hard read voltage before reading the first hard read data; and cache the second hard read data to the memory; the hard decoder is configured to: perform the hard decision decoding on the first hard read data; the processor is further configured to: obtain a corresponding first soft data according to the first hard read data and the cached second hard read data after the hard decision decoding for the first hard read data fails; send the first hard read data or the second hard read data to the soft decoder; and send the first soft data to the soft decoder; and the soft decoder is configured to: perform the first soft decision decoding according to the first soft data and the first hard read data, or perform the first soft decision decoding according to the first soft data and the second hard read data.

In the above examples, the memory is further configured to cache the first hard read data; the processor is further configured to: read a third hard read data according to a third hard read voltage after the first soft decision decoding fails; the hard decoder is further configured to: perform the hard decision decoding on the third hard read data; the processor is further configured to: obtain a corresponding second soft data according to the cached first hard read data and the third hard read data after the hard decision decoding for the third hard read data fails; and the soft decoder is further configured to: perform the first soft decision decoding according to the second soft data and the first hard read data, or perform the first soft decision decoding according to the second soft data and the third hard read data.

In the above examples, the processor is further configured to: determine whether: the hard decision decoding is successful, the first soft decision decoding is successful, or a number of retries of hard read reaches a first set threshold; and if so, finish a first stage of error correction code (ECC) error correction.

In the above examples, the soft decoder is further configured to: perform a second stage of ECC error correction after the first stage of ECC error correction fails, wherein the second stage of ECC error correction comprises: performing at least one second soft decision decoding; and wherein the second stage of ECC error correction is finished if: the second soft decision decoding is successful, or a number of retries of soft read reaches a second set threshold.

In the above examples, the memory controller further comprises: an RAIN error corrector configured to: perform a third stage of redundant array of independent NAND (RAIN) error correction after the second stage of ECC error correction fails; the processor is further configured to: output indication information for characterizing decoding failure after the third stage of RAIN error correction fails; and output read data successfully decoded if: the first stage of ECC error correction is successful, the second stage of ECC error correction is successful, or the third stage of RAIN error correction is successful.

In a third aspect, examples of the present disclosure further provide a memory controller, comprising: a processor, a memory, a hard decoder and a soft decoder, wherein: the processor is configured to: read first hard read data from a memory device coupled with the memory controller according to a first hard read voltage; read a second hard read data from the memory device according to a second hard read voltage before reading the first hard read data; and cache the second hard read data to the memory; the hard decoder is configured to: perform hard decision decoding on the first hard read data; the processor is further configured to: obtain a corresponding first soft data according to the first hard read data and the cached second hard read data after the hard decision decoding for the first hard read data fails; send the first hard read data or the second hard read data to the soft decoder; and send the first soft data to the soft decoder; the soft decoder is configured to: perform the first soft decision decoding according to the first soft data and the first hard read data, or perform the first soft decision decoding according to the first soft data and the second hard read data; and the processor is further configured to: determine whether o: the hard decision decoding is successful, the first soft decision decoding is successful, or a number of retries of hard read reaches a first set threshold; and if so, finish a first stage of error correction code (ECC) error correction; wherein the first hard read voltage is one of a plurality of re-read voltages with a certain offset from an initial read voltage, and the second hard read voltage is the initial read voltage or a re-read voltage of the plurality of re-read voltages except the first hard read voltage.

Examples of the present disclosure provide an error correction method for a memory system, a memory system and a memory controller. The error correction method comprises: obtaining a corresponding first soft data according to first hard read data and cached second hard read data after hard decision decoding for the first hard read data fails, wherein the first hard read data is read by the memory system according to a first hard read voltage, and the second hard read data is read by the memory system according to a second hard read voltage before reading the first hard read data; and performing first soft decision decoding according to the first soft data and the first hard read data, or performing first soft decision decoding according to the first soft data and the second hard read data, wherein the first hard read voltage is one of a plurality of re-read voltages with a certain offset from an initial read voltage; and the second hard read voltage is the initial read voltage or a re-read voltage of the plurality of re-read voltages except the first hard read voltage. According to the error correction method provided by the examples of the present disclosure, when the read operation is performed on the memory system, by adding one first soft decision decoding after the hard decision decoding of re-read fails, a high error correction capability of the soft decision decoding is utilized to increase an error correction speed, thus increasing a read speed.

BRIEF DESCRIPTION OF THE DRAWINGS

The drawings are not necessarily drawn to scale, the like signs may describe similar components in different views. Like numerals having different letter suffixes may represent different instances of similar components. The drawings illustrate generally, by way of example, but not by way of limitation, various examples discussed in the present document.

FIG. 9 is a flow diagram III of an error correction method for a memory system provided by an example of the present disclosure.

DETAILED DESCRIPTION

Figure 1:
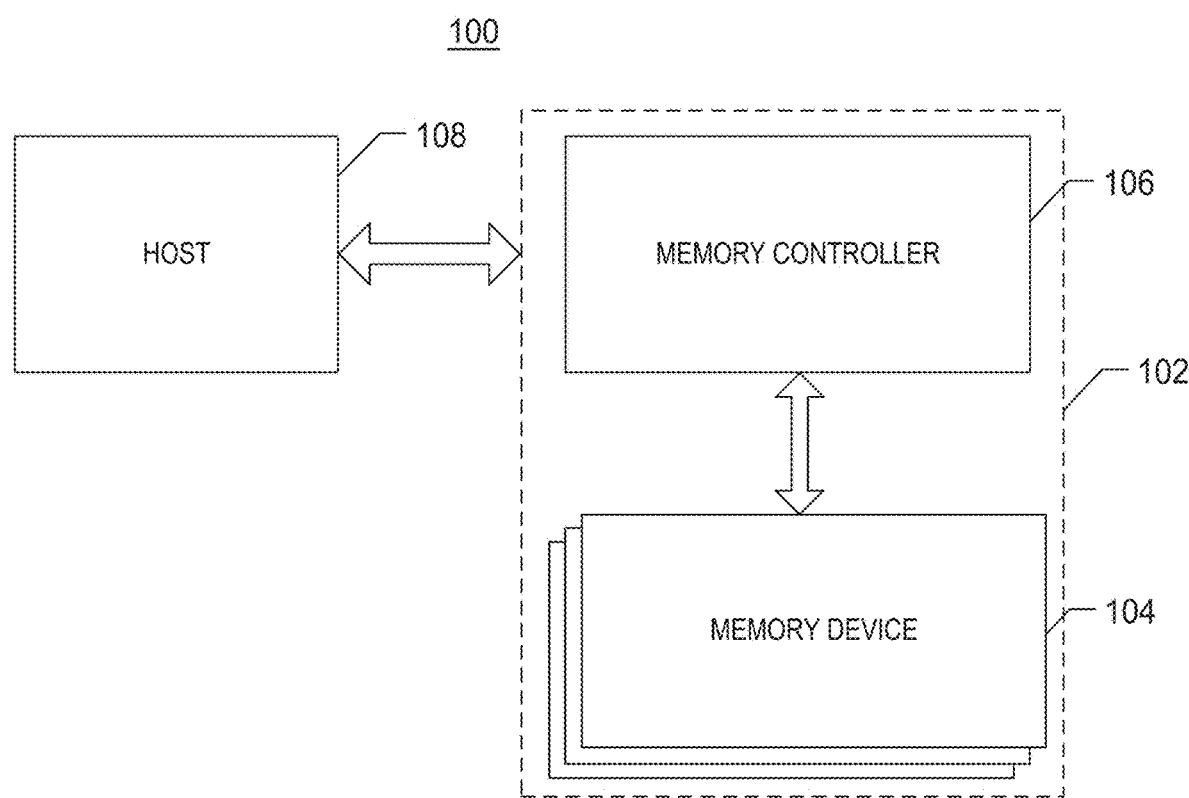
FIG. 1 is a schematic diagram of an example system having a memory system provided by an example of the present disclosure.

Examples disclosed by the present disclosure will be described below in detail with reference to the figures. Although the figures show the examples of the present disclosure, the present disclosure may be implemented by any form which is not limited by the specific examples as set forth herein. Rather, these examples are provided in order for understanding the present disclosure more thoroughly, and can fully convey the scope disclosed by the present disclosure to those skilled in the art.

In the description below, many specific details are presented to provide a more thorough understanding of the present disclosure. However, the present disclosure may be carried out without one or more of these details. In other examples, in order to avoid confusing with the present disclosure, some technical features well-known in the art are not described. For example, not all features of actual examples are described herein, and well-known functions and structures are not described in detail.

In the drawings, sizes and relative sizes of layers, areas and elements may be exaggerated for clarity. Like reference numerals denote like elements throughout the specification.

When an element or a layer is referred to as being "on", "adjacent to", "connected to", or "coupled to" other elements or layers, it may be directly on, adjacent to, connected to, or coupled to the other elements or layers, or one or more intervening elements or layers may be present. In contrast, when an element is referred to as being "directly on", "immediately adjacent to", "directly connected to", or "directly coupled to" other elements or layers, no intervening elements or layers are present. Although the terms first, second, third, etc., may be used to describe various elements, components, areas, layers and/or portions, these elements, components, areas, layers and/or portions should not be limited by these terms. These terms are only used to distinguish one element, component, area, layer or portion from another element, component, area, layer or portion. Thus, a first element, component, area, layer or portion discussed below may be represented as a second element, component, area, layer or portion, without departing from the teachings of the present disclosure. When the second element, component, area, layer or portion is discussed, it does not mean that the first element, component, area, layer or portion is necessarily present in the present disclosure.

The spatially relative terms, such as "beneath", "below", "lower", "under", "over", "upper", and the like, may be used herein for ease of description to describe the relationship between one element or feature and other elements or features as illustrated in the figures. The spatially relative terms are intended to further encompass different orientations of a device in use or operation in addition to the orientation depicted in the figures. For example, if a device in the drawings is turned over, then an element or a feature described as "below other elements", or "under other elements", or "beneath other elements" will be orientated to be "above" the other elements or features. Thus, the example terms, "below" and "beneath", may include both upper and lower orientations. The device may be orientated otherwise (rotated by 90 degrees or other orientations), and the spatially descriptive terms used herein are interpreted accordingly.

The terms used herein are only intended to describe the specific examples, and are not used as limitations of the present disclosure. As used herein, unless otherwise indicated expressly in the context, "a", "one" and "the" in a singular form are also intended to include a plural form. The terms "consist of" and/or "comprise", when used in this specification, determine the presence of a feature, integer, step, operation, element and/or component, but do not preclude the presence or addition of one or more of other features, integers, steps, operations, elements, components, and/or groups. As used herein, the term "and/or" includes any and all combinations of the listed relevant items.

To be capable of understanding the characteristics and the technical contents of the examples of the present disclosure in more detail, implementation of the examples of the present disclosure is set forth in detail below in conjunction with the drawings, and the appended drawings are only used for reference and illustration, instead of being used to limit the examples of the present disclosure.

The memory device in the examples of the present disclosure includes, but is not limited to, a three-dimensional NAND memory. In order to facilitate understanding, the illustration is made by taking the three-dimensional NAND memory as an example.

The examples of the present disclosure are further illustrated below in detail in conjunction with the drawings and particular examples.

FIG. 1 shows a block diagram of an example system 100 having a memory system 102. In FIG. 1, the system 100 may be a mobile phone, a desktop computer, a laptop computer, a tablet computer, a vehicle computer, a gaming console, a printer, a positioning apparatus, a wearable electronic apparatus, a smart sensor, a Virtual Reality (VR) apparatus, an Augmented Reality (AR) apparatus, or any other suitable electronic apparatuses having memory systems therein. As shown in FIG. 1, the system 100 may comprise a host 108 and a memory system 102, wherein the host 108 may comprise a processor, such as a central processing unit (CPU) or a system on chip (SoC), and wherein the system on chip may be, for example, an application processor (AP). The host 108 further comprises at least one operating system (OS) which can manage and control functions and operations executed in the host 108. The OS can enable the host 108 coupled with the memory system 102 and a user needing and using the memory system 102 to interoperate. The OS can support functions and operations corresponding to a request of the user, for example, not by way of limitation, depending on whether a type of the host 102 is a mobile host, the OS may be classified into a general operating system and a mobile operating system, wherein the general operating system may include a personal operating system and an enterprise operating system. The personal operating system may be an operating system for supporting service for general purposes including WINDOWS and CHROME. The enterprise operating system may be an operating system for supporting higher performance, including WINDOWS server, LINUX, UNIX, and the like. The mobile operating system may refer to an operating system for mobile service or function (e.g., a power saving function). In general, the mobile operating system may be an operating system such as ANDROID, IOS, WINDWOS MOBILE and the like. In some examples, the host 108 may comprise a plurality of OSs. Correspondingly, the host 108 may run a plurality of operating systems related to the memory system 102. In some other examples, the host 108 converts the request of the user to one or more commands, and transfers the one or more commands into the memory system 102 to cause the memory system 102 to execute operations related to the one or more commands.

The memory system 102 can operate or perform particular functions or perform various internal operations in response to the request of the host 108. In some examples, the memory system 102 can store data accessed by the host 108. The memory system 102 can act as a primary memory system or a secondary memory system of the host 108. The memory system 102 and the host 108 can be electrically joined and communicate according to a corresponding protocol. The memory system 102 can be implemented and packaged in different types of end electronic products, including, but not limited to, a solid-state drive (SSD), a multi-media card (MMC), an embedded MMC (eMMC), a reduced size MMC (RSMMC), a micro MMC, a Secure Digital (SD) card, a mini SD, a micro SD, a Universal Serial Bus (USB) memory apparatus, a Universal Flash Storage (UFS) apparatus, a Compact Flash (CF) card, a smart media (SM) card, and a memory stick, etc.

In some examples, the memory system 102 may be further configured, for example, as a part of the following devices: a computer, an ultra-mobile PC (UMPC), a workstation, a netbook, a personal digital assistant (PDA), a portable computer, a network tablet, a tablet computer, a wireless telephone, a mobile telephone, a smartphone, an electronic book, a portable multimedia player (PMP), a portable game machine, a navigation system, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a memory device configured with a data center, a device capable of transmitting and receiving information in a wireless environment, one of various electronic devices configured with a home network, one of various electronic devices configured with a computer network, one of various electronic devices configured with a remote information processing network, a radio frequency identification (RFID) device, or one of various components configured with a computing system.

Figure 2B:
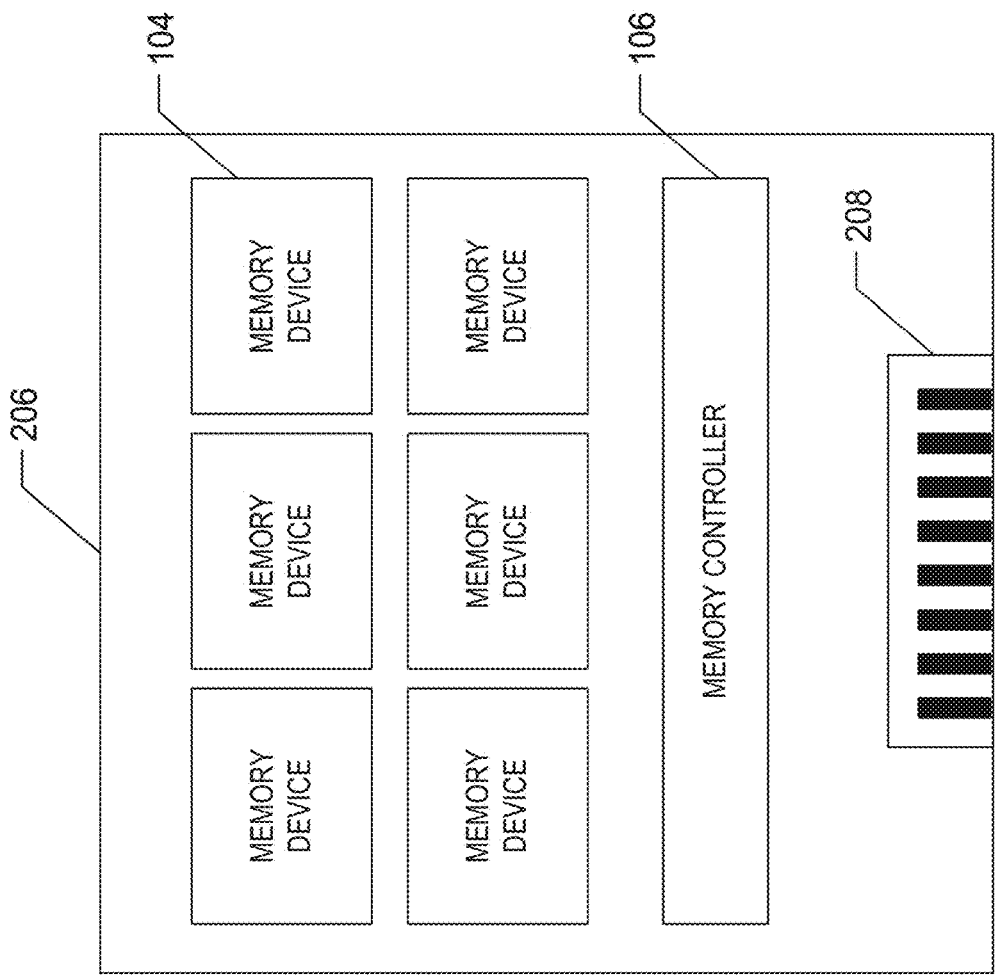
FIG. 2*b* is a schematic diagram of an example solid-state drive having a memory system provided by an example of the present disclosure.
Figure 2A:
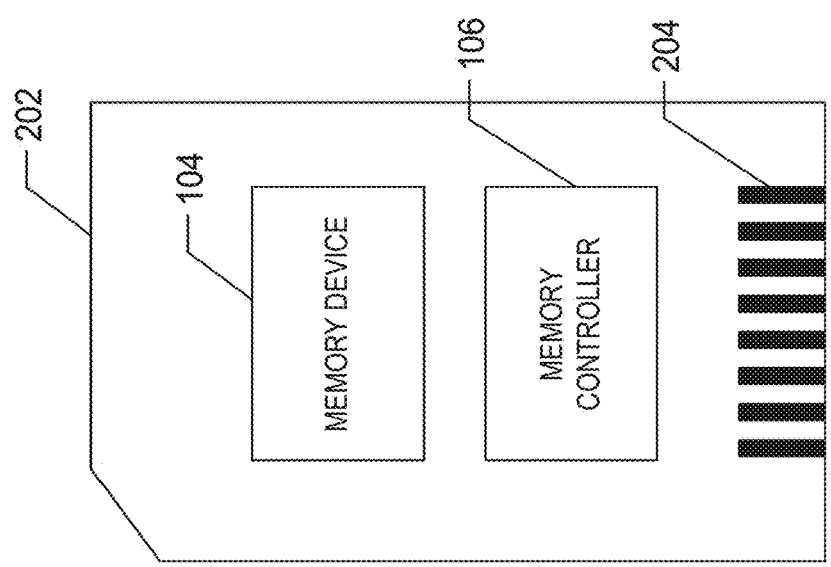
FIG. 2*a* is a schematic diagram of an example memory card having a memory system provided by an example of the present disclosure.

Returning to FIG. 1, the memory device 102 may have one or more memory devices 104 and a memory controller 106. The memory controller 106 may control the memory device 104 in response to a request of the host 108. For example, the memory controller 106 can read data from the memory device 104 and transfer the read data to the host 108, and may also receive data to be stored from the host 108 and store the data to be stored to the memory device 104. For example, the memory controller 106 can control write (or program) operation, read operation, erase operation or background operation, etc. of the memory device 104. Moreover, the memory system 102 can be implemented and packaged into different types of end electronic products. In one example as shown in FIG. 2a, the memory controller 106 and a single memory device 104 may be integrated into a memory card 202. The memory card 202 may include a PC card (PCMCIA, Personal Computer Memory Card International Association), a CF card, a Smart Media (SM) card, a memory stick, a Multimedia card (MMC, RS-MMC, MMC-micro), an SD card (SD, miniSD, microSD, SDHC), a UFS, etc. The memory card 202 may further comprise a memory card connector 204 coupling the memory card 202 with a host (e.g., the host 108 in FIG. 1). In another example, as shown in FIG. 2b, the memory controller 106, and multiple memory devices 104 may be integrated into an SSD 206. The SSD 206 may further include an SSD connector 208 coupling the SSD 206 with a host (e.g., the host 108 in FIG. 1). In some implementations, the storage capacity and/or the operation speed of the SSD 206 are greater than the storage capacity and/or the operation speed of the memory card 202.

The memory device 104 may comprise a non-volatile memory which can remain data stored therein even if it is not supplied with power. The memory device 104 may further comprise a volatile memory. The device 104 may store data provided from the host 108 through a write operation, and the memory device 104 may also provide the stored data to the host 108 through a read operation. In examples of the present disclosure, the memory device 104 may comprise any memory as disclosed, for example, a volatile memory device such as a dynamic random access memory (DRAM) and a static RAM (SRAM), or a non-volatile memory device such as a read-only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magnetoresistive RAM (MRAM), a resistive RAM (RRAM or ReRAM) and a flash memory (e.g., a three-dimensional NAND flash).

Figure 3:
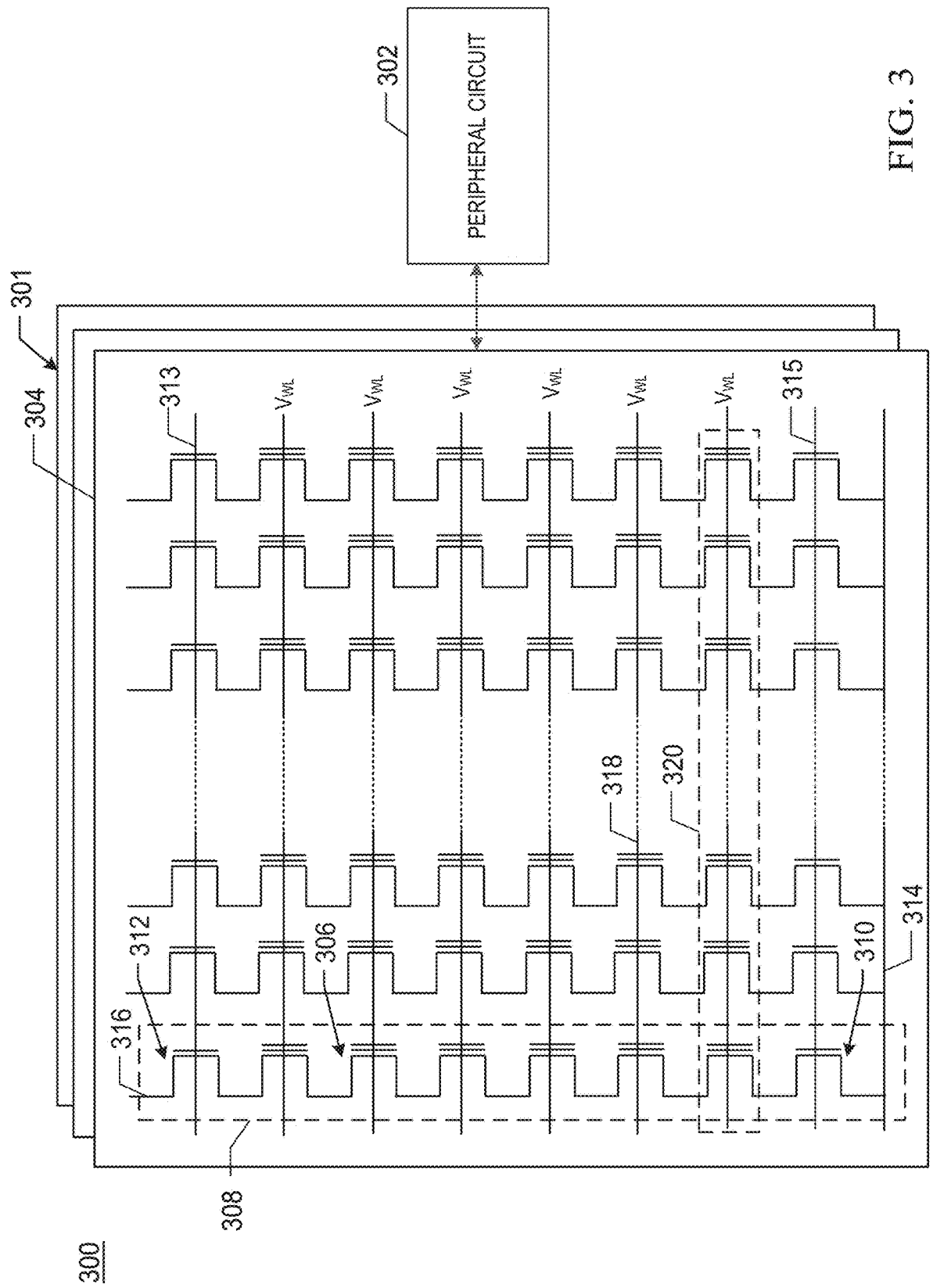
FIG. 3 is a schematic diagram of an example memory comprising a peripheral circuit provided by an example of the present disclosure.

FIG. 3 shows a schematic circuit diagram of an example memory device 300 comprising a peripheral circuit 302 according to some aspects of the present disclosure. The memory device 300 may be an example of the memory devices 104 in FIG. 1. The memory device 300 may comprise a memory array 301 and a peripheral circuit 302 coupled to the memory array 301. The memory array 301 is described by taking a three-dimensional NAND memory array as an example, wherein memory cells 306 are provided in an array of NAND memory strings 308, and each NAND memory string 308 extends vertically above a substrate (not shown). In some implementations, each NAND memory string 308 comprises a plurality of memory cells 306 that are coupled in series and stacked vertically. Each memory cell 306 can hold a continuous, analog value, such as an electrical voltage or charge, that depends on the number of electrons trapped within a region of the memory cell 306. Each memory cell 306 may be either a "floating gate" type memory cell that includes a floating gate transistor, or a "charge trap" type memory cell that includes a charge trap transistor.

In some implementations, each memory cell 306 is a single-level cell (SLC) having two possible memory states and therefore can store one bit of data. For example, the first memory state "0" may correspond to a first range of voltage, and the second memory state "1" may correspond to a second range of voltage. In some implementations, each memory cell 306 is a multi-level cell (MLC) that is capable of storing more than one bit of data in more than four memory states. For example, the MLC can store two bits per memory cell, three bits per memory cell (also called a trinary-level cell (TLC)), four bits per memory cell (also called a quad-level cell (QLC)), or five bits per memory cell (also called a penta-level cell (PLC)). Each MLC can be programmed to employ a range of possible nominal storage values. In an example, if each MLC stores two bits of data, the MLC can be programmed to employ one of three possible program levels from an erase state by writing one of three possible nominal storage values to the cell, and a fourth nominal storage value may be used for the erase state.

As shown in FIG. 3, each NAND memory string 308 may comprise a bottom select gate (BSG) 310 at its source terminal and a top select gate (TSG) 312 at its drain terminal. BSG 310 and TSG 312 may be configured to activate the selected NAND memory string 308 during the read and program operations. In some implementations, the sources of the NAND memory strings 308 in the same memory block 304 are coupled through the same source line (SL) 314 (e.g., a common SL). In other words, according to some implementations, all the NAND memory strings 308 in the same memory block 304 have an array common source (ACS). According to some implementations, the TSG 312 of each NAND memory string 308 is coupled to a respective bit line (BL) 316 which the data can be read from or written to via an output bus (not shown). In some implementations, each NAND memory string 308 is configured to be selected or unselected by applying a select voltage (e.g., above a threshold voltage of a transistor having the TSG 312) or an unselect voltage (e.g., 0 V) to the respective TSG 312 via one or more TSG lines 313 and/or by applying a select voltage (e.g., above a threshold voltage of a transistor having the BSG 310) or an unselect voltage (e.g., 0 V) to the respective BSG 310 via one or more BSG lines 315.

As shown in FIG. 3, the NAND memory strings 308 can be organized into multiple memory blocks 304, each of which may have a common source line 314, e.g., coupled to the ground. In some implementations, each memory block 304 is a basic data unit for the erase operation, e.g., all of the memory cells 306 on the same memory block 304 are erased at the same time. To erase the memory cells 306 in a selected memory block 304, the source lines 314 coupled to the selected memory block 304 as well as unselected memory blocks 304 that are in the same plane as the selected memory block 304 can be biased with an erase voltage (Vers), such as a high positive voltage (e.g., 20 V or higher). In some examples, an erase operation may be performed at a half memory block level, a quarter memory block level, or a level having any suitable number of memory blocks or any suitable fractions of a memory block. The memory cells 306 of adjacent ones of the NAND memory strings 308 may be coupled through word lines 318 that select which row of memory cells 306 is affected by the read and program operations. In some implementations, each word line 318 is coupled to a page 320 of the memory cells 306, page 320 being the basic data unit for the program operations. The size of one page 320 in bits can relate to the number of NAND memory strings 308 coupled by the word line 318 in one memory block 304. Each word line 318 may comprise a plurality of control gates (gate electrodes) at each memory cell 306 in the respective page 320 and a gate line coupling the control gates.

Figure 4:
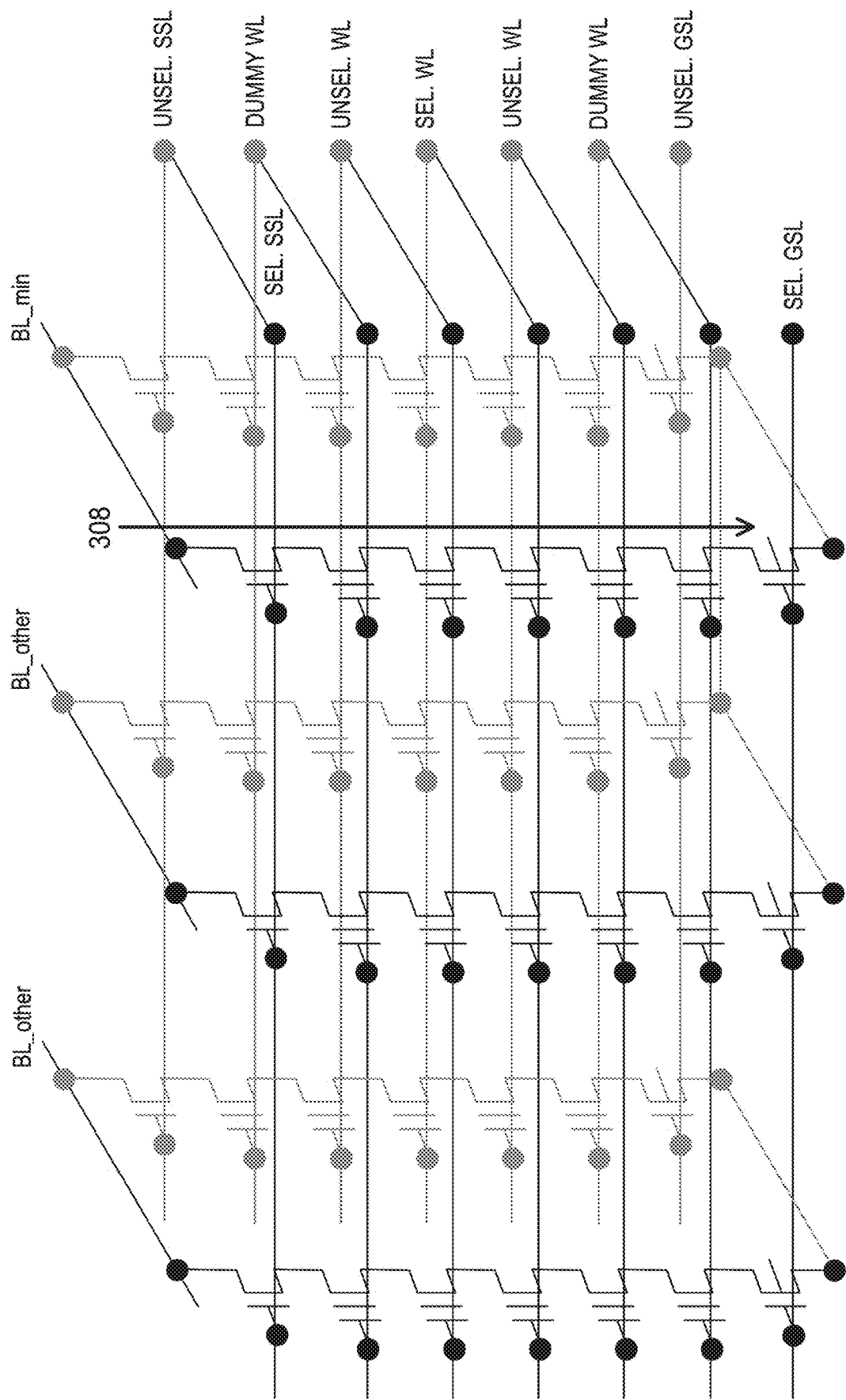
FIG. 4 is a schematic structure diagram of a memory string, a word line and a bit line in a memory provided by an example of the present disclosure.

Referring to FIGS. 3 and 4, each of the plurality of memory cells 306 is coupled to the respective word line 318, and each memory string 308 is coupled to the respective bit line 316 through a respective select transistor (such as, the top select transistor (TSG) 312).

In an example, referring to FIG. 4, the memory device may comprise one or more memory strings 308 (shown by an arrow in FIG. 4), each memory string may comprise a top select transistor (SST) corresponding to a top select transistor gate line (SSL), a ground select transistor (GST) corresponding to a bottom select transistor gate line (GSL), and a plurality of memory cells between the top select transistor and the ground select transistor, and each memory string is connected to the respective bit line BL and a unified common source line respectively.

Here, referring to FIG. 4, the word line coupled to the selected page is a selected word line (Sel.WL) which may be any of a plurality of word lines in the memory, and other word lines are unselected word lines (Usel.WL) or dummy word lines (Dummy WL). Bit lines BL in the memory may be divided into two portions, a portion of the bit lines are connected with the memory cells in a lowest state (e.g., an erase state) of the memory cells coupled with the selected word line, and labeled as first bit lines (BL_min), and the other portion of the bit lines are connected with the memory cells other than the memory cells in the lowest state (e.g., the erase state) and the memory cells having reached a target state of the memory cells coupled with the selected word line, and labeled as second bit lines (BL_other). During actual operation, some target memory cell of the plurality of memory cells may be selected by selecting the respective word line and the bit line to perform the respective read and program operations.

Figure 5:
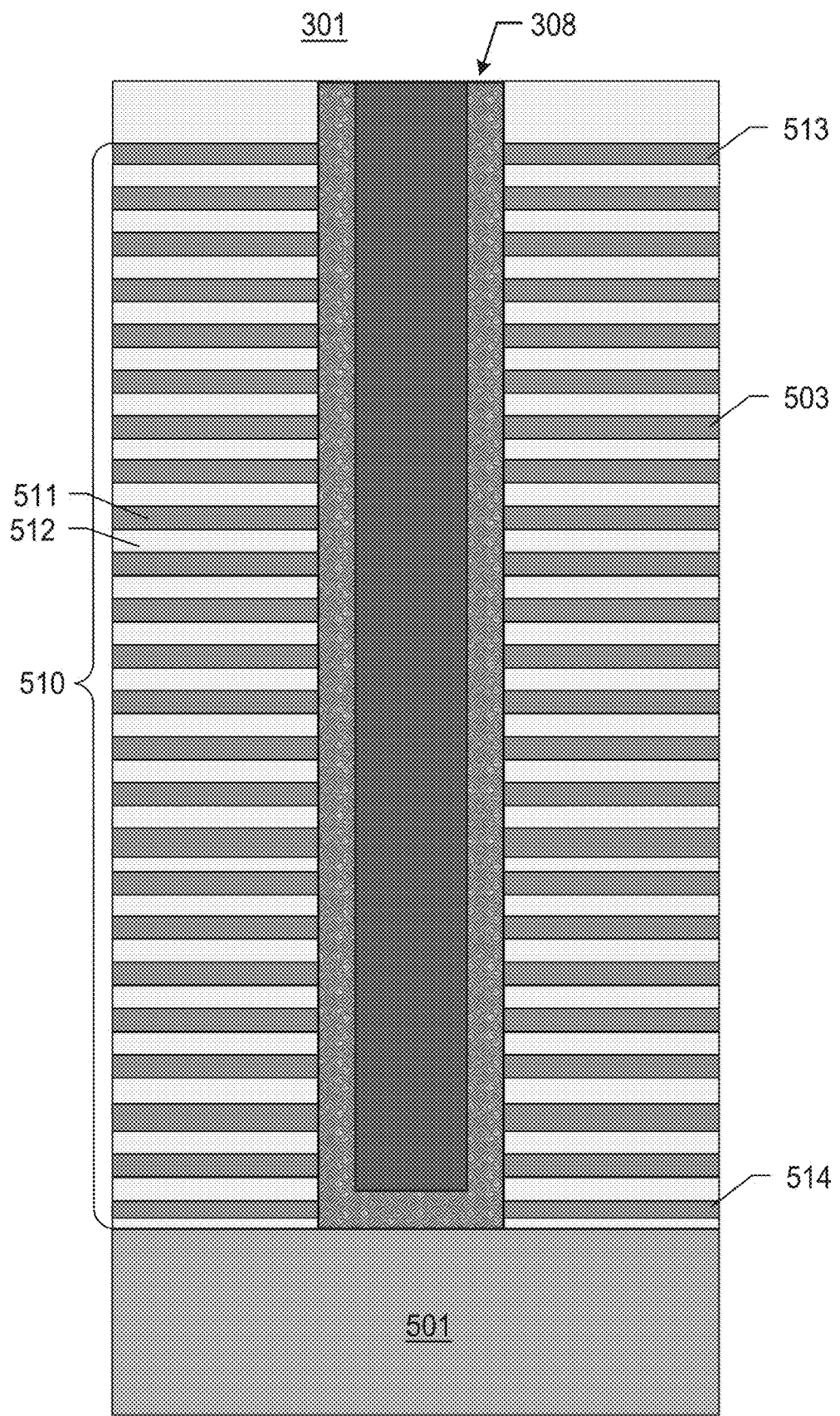
FIG. 5 is a schematic cross-sectional view of a memory array comprising NAND memory strings provided by an example of the present disclosure.

FIG. 5 shows a schematic cross-sectional view of an example memory array 301 comprising a NAND memory string 308 according to some aspects of the present disclosure. As shown in FIG. 5, the NAND memory string 308 may comprise a stack structure 510 which comprises a plurality of gate layers 511 and a plurality of insulation layers 512 that are disposed in a stack alternately and sequentially, and a memory string 308 penetrating through the gate layers 511 and the insulation layers 512 vertically. The gate layers 511 and the insulation layers 512 may be stacked alternately, and two adjacent ones of the gate layers 511 are separated by one insulation layer 512. The number of pairs of the gate layers 511 and the insulation layers 512 in the stack structure 510 may determine the number of memory cells that are included in the memory array 301.

A composition material of the gate layers 511 may include a conductive material, including, but not limited to, tungsten (W), cobalt (Co), copper (Cu), aluminum (Al), polysilicon, doped silicon, silicides, or any combination thereof. In some implementations, each gate layer 511 comprises a metal layer, e.g., a tungsten layer. In some implementations, each gate layer 511 comprises a doped polysilicon layer. Each gate layer 511 may comprise a control gate around the memory cells. The gate layer 511 at a top of the stack structure 510 may extend laterally as an upper select gate line 513; the gate layer 511 at a bottom of the stack structure 510 may extend laterally as a lower select gate line 514; and the gate layers 511 that extend laterally between the upper select gate line and the lower select gate line may act as word line layers 503.

In some examples, the stack structure 510 may be disposed on a substrate 501. The substrate 501 may include silicon (e.g., single crystalline silicon), silicon germanium (SiGe), gallium arsenide (GaAs), germanium (Ge), silicon on insulator (SOI), germanium on insulator (GOI), or any other suitable materials.

In some examples, the NAND memory string 308 comprises a channel structure that extends through the stack structure 510 vertically. In some implementations, the channel structure comprises a channel hole filled with (one or more) semiconductor materials (e.g., as a semiconductor channel) and (one or more) dielectric materials (e.g., as a memory film). In some implementations, the semiconductor channel comprises silicon, e.g., polysilicon. In some implementations, the memory film is a composite dielectric layer including a tunneling layer, a storage layer (also known as a "charge trap/storage layer"), and a blocking layer. The channel structure may have a cylindrical shape, e.g., a pillar shape. According to some implementations, the semiconductor channel, the tunneling layer, the storage layer, and the blocking layer are arranged radially from the center toward the outer surface of the pillar in this order. The tunneling layer can include silicon oxide, silicon oxynitride, or any combination thereof. The storage layer can include silicon nitride, silicon oxynitride, or any combination thereof. The blocking layer can include silicon oxide, silicon oxynitride, a high dielectric constant (high-k) dielectric, or any combination thereof. In an example, the memory film can include a composite layer of silicon oxide/silicon oxynitride/silicon oxide (ONO).

Figure 6:
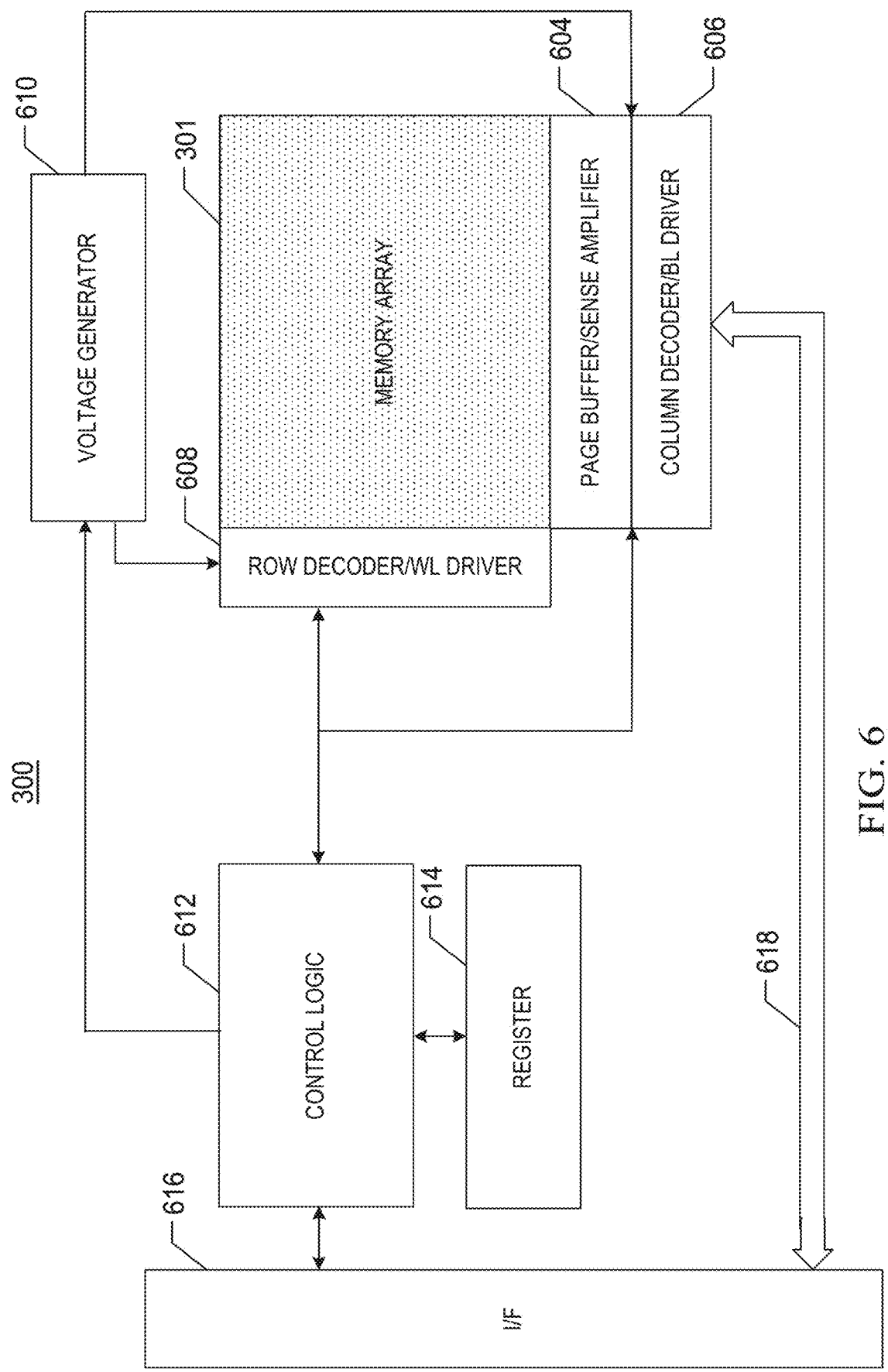
FIG. 6 is a schematic diagram of an example memory comprising a memory array and a peripheral circuit provided by an example of the present disclosure.

Referring back to FIG. 3, the peripheral circuit 302 may be coupled to the memory array 301 through bit lines 316, word lines 318, source lines 314, BSG lines 315 and TSG lines 313. The peripheral circuit 302 may include any suitable analog, digital, and hybrid signal circuits for facilitating the operations of the memory array 301 by applying and sensing voltage signals and/or current signals to and from each target memory cell 306 via the bit lines 316, the word lines 318, the source lines 314, the BSG lines 315, and the TSG lines 313. The peripheral circuit 302 may include various types of peripheral circuits formed using a metal-oxide-semiconductor (MOS) technology. For example, FIG. 6 shows some example peripheral circuits. The peripheral circuit 302 comprises a page buffer/sense amplifier 604, a column decoder/bit line driver 606, a row decoder/word line driver 608, a voltage generator 610, a control logic 612, a register 614, an interface 616, and a data bus 618. In some examples, additional peripheral circuits not shown in FIG. 6 may be included as well.

The page buffer/sense amplifier 604 may be configured to read and program (write) data from and to the memory array 301 according to control signals from the control logic 612. In an example, the page buffer/sense amplifier 604 may store one page of program data (write data) to be programmed into one page 320 of the memory array 301. In another example, the page buffer/sense amplifier 604 may perform programming verify operations to verify that the data has been properly programmed into the memory cells 306 that are coupled to the selected word lines 318. In yet another example, the page buffer/sense amplifier 604 may also sense low power signals from the bit lines 316 that represent data bits stored in the memory cells 306, and amplify small voltage swings to recognizable logic levels in read operations. The column decoder/bit line driver 606 may be configured to be controlled by the control logic 612 and select one or more NAND memory strings 308 by applying bit line voltages generated from the voltage generator 610.

The row decoder/word line driver 608 may be configured to be controlled by the control logic 612 and select/deselect the memory blocks 304 of the memory array 301 and select/deselect the word lines 318 of the memory blocks 304. The row decoder/word line driver 608 may be further configured to drive the word lines 318 using word line voltages generated from the voltage generator 610. In some implementations, the row decoder/word line driver 608 may also select/unselect and drive the BSG lines 315 and the TSG lines 313. The row decoder/word line driver 608 may be configured to perform the program operations on the memory cells 306 that are coupled to (one or more) selected word lines 318. The voltage generator 610 may be configured to be controlled by the control logic 612 and generate a word line voltage (such as, a read voltage, a program voltage, a pass voltage, a channel boost voltage, a verify voltage, etc.), a bit line voltage and a source line voltage to be supplied to the memory array 301.

The control logic 612 may be coupled to each peripheral circuit described above and configured to control the operations of each peripheral circuit. The register 614 may be coupled to the control logic 612 and include a state register, a command register, and an address register for storing state information, command operation codes (OP codes), and command addresses for controlling the operations of each peripheral circuit. The interface 616 may be coupled to the control logic 612, and act as a control buffer to buffer and relay control commands received from a host (not shown) to the control logic 612 and buffer and relay state information received from the control logic 612 to the host. The interface 616 may be also coupled to the column decoder/bit line driver 606 via a data bus 618 and act as a data I/O interface and a data buffer to buffer and relay the data to the memory array 301 or relay or buffer the data from the memory array 301.

In the NAND memory device, the single-level cell (SLC) occupies a certain share in the memory market due to its advantages such as fast read-write speeds, high reliability and long service life, while the multi-level cell (MLC), the trinary-level cell (TLC), and the quad-level cell (QLC) becomes a development trend of the memory market due to higher memory density and higher memory capacity.

However, with the increase of the number of stored bits and the increase of the number of stack layers of the memory cell, it includes more and more complex types of errors. The error correction procedure commonly used at present (including: hard decision error correction is performed first; when the error correction fails, soft decision error correction is then performed; if the error correction fails, redundant array of independent NAND error correction is performed at last) has a longer error correction time, seriously affecting a read rate.

Based on one or more of the above challenges, examples of the present disclosure provide an error correction method for a memory system. In a hard decision error correction stage, after hard decision decoding of re-read fails, a first soft decision decoding is added, so as to increase an error correction speed using a high error correction capability of the soft decision decoding, thus increasing the read speed.

Figure 7:
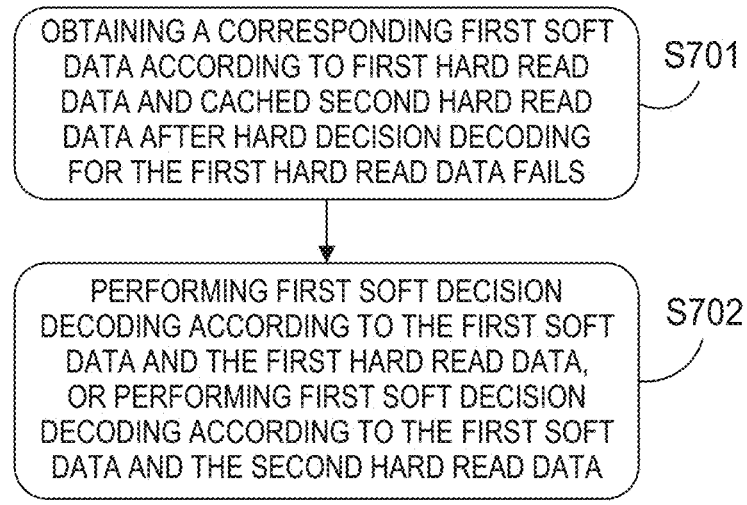
FIG. 7 is a flow diagram I of an error correction method for a memory system provided by an example of the present disclosure.

Referring to FIG. 7, FIG. 7 is a flow diagram of an error correction method for a memory system provided by an example of the present disclosure.

In an example, the error correction method may comprise:
S701: obtaining a corresponding first soft data according to first hard read data and cached second hard read data after hard decision decoding for the first hard read data fails; and S702: performing first soft decision decoding according to the first soft data and the first hard read data, or performing first soft decision decoding according to the first soft data and the second hard read data, wherein the first hard read data is read by the memory system according to a first hard read voltage, and the second hard read data is read by the memory system according to a second hard read voltage before reading the first hard read data, wherein the first hard read voltage is one of a plurality of re-read voltages with a certain offset from an initial read voltage, and the second hard read voltage is the initial read voltage or a re-read voltage of the plurality of re-read voltages except the first hard read voltage.

The memory system may be any one memory system as described above, and has one or more functions as described above. The technical solution as described herein is that after the hard decision decoding for the first hard read data fails, the first soft decision decoding is added to accelerate the error correction speed using the high error correction capability of the soft decision decoding.

Here, the first hard read data may be obtained by reading by the memory system according to a first hard read voltage, while the first hard read voltage may be one of a plurality of re-read voltages with a certain offset from the initial read voltage. Here, the initial read voltage may refer to a first voltage value for the read operation during the hard decision error correction, wherein the initial read voltage may be preset in the memory system according to experience. The initial read voltage may be the same as or different from a reference voltage in a Retry Read Table (RRT).

The RRT is a table including a plurality of voltage offsets, wherein each voltage offset is relative to the reference voltage. These voltage offsets can be achieved by a hardware circuit in the memory, for example, these voltage offsets are set by a register included in the memory. For example, all the read voltages are required voltage values obtained by superposition of required voltage offsets obtained according to the RRT with the reference voltage (including superposition of signs, e.g., if the voltage offsets are negative, the final read voltages are smaller than the reference voltage), which are then applied to the respective word lines.

For example, in the hard decision error correction stage, the initial read voltage of a group of hard read voltages (including the initial read voltage and the plurality of re-read voltage) used may be obtained according to the RRT, wherein when its voltage offset is 0, the initial read voltage is the same as the reference voltage in numerical value; and if its voltage offset is not 0, the initial read voltage is different from the reference voltage in numerical value. Moreover, the plurality of re-read voltages are a group of voltage values with certain offsets from the initial read voltage by taking the initial read voltage as a reference, wherein the offset here may be either different from or the same as an interval between the voltage offsets in the foregoing RRT.

TABLE 1

| RRT | | | | | | |
|---|---|---|---|---|---|---|
| Rd1 | Rd2 | Rd3 | Rd4 | Rd5 | Rd6 | Rd7 |
| — | — | — | — | — | — | 0 |
| — | — | — | — | — | — | +V1 |
| — | — | — | — | — | — | +V2 |

TABLE 1-continued

| RRT | | | | | | |
|-----|-----|-----|-----|-----|-----|-----|
| Rd1 | Rd2 | Rd3 | Rd4 | Rd5 | Rd6 | Rd7 |
| — | — | — | — | — | — | +V3 |
| — | — | — | — | — | — | +V4 |
| — | — | — | — | — | — | −V5 |
| — | — | — | — | — | — | −V6 |
| — | — | — | — | — | — | −V7 |
| — | — | — | — | — | — | −V8 |
| — | — | — | — | — | — | −V9 |
| — | — | — | — | — | — | −V10 |
| — | — | — | — | — | — | −V11 |

For example, as shown in Table 1, it is an RRT corresponding to a TLC type of memory cell provided by examples of the present disclosure. Rd1 to Rd7 in Table 1 represent voltage offsets between different data states; each column represents a group of voltage offsets of the adjacent program states relative to the corresponding reference voltage, wherein the group of voltage offsets include positive offsets increased in a direction greater than the reference voltage and negative offsets decreased in a direction less than the reference voltage, for example, for Rd7, +V1, +V2, +V3 and +V4 are positive offsets, wherein numerical values of V1, V2, V3 and V4 increase sequentially; and −V5 to −V11 are negative offsets, wherein numerical values of V5 to V11 decrease sequentially.

On the basis of the above Table 1, a group of hard read voltages used by the examples of the present disclosure are illustrated by way of example. The initial read voltage included therein may have no offset relative to the reference voltage in the RRT table, e.g., by taking Rd7 as an example. An offset of the initial read voltage relative to the reference voltage is 0, e.g., the numerical value corresponding to the first row in Table 1. The initial read voltage may be also +V1 offset from the reference voltage in the RRT table, and in this case, the initial read voltage is a sum of the reference voltage and V1. Other hard read voltages of the group of hard read voltages except the initial read voltage are distributed on two sides of the initial read voltage, and the offset of each hard read voltage relative to the initial read voltage and the offset in the RRT may be either different or the same.

The first soft data required for performing the first soft decision decoding may be obtained according to the first hard read data and the cached second hard read data. In some examples, obtaining the corresponding first soft data according to the first hard read data and the cached second hard read data may comprise: performing XOR operation on the first hard read data and the second hard read data to obtain the first soft data.

Here, the second hard read data may be read by the memory system according to the second hard read voltage, wherein the second hard read voltage may be the initial read voltage or a re-read voltage of the plurality of re-read voltages except the first hard read voltage, and the second hard read data is read before the first hard read data. If the first hard read voltage is a first re-read after the initial read voltage, the second hard read voltage is the initial read voltage; if the first hard read voltage is not the first re-read after the initial read voltage, the second hard read voltage is a re-read voltage of the plurality of re-read voltages except the first hard read voltage.

The example as described in FIG. 7 is to add a first soft decision decoding after the hard decision decoding fails. In this case, first soft read data required in the first soft decision decoding is not required to be read from the memory in the memory system, but is obtained by performing XOR calculation on the above-mentioned two cached hard read data, thus saving time. Moreover, the decoding capability of the first soft decision decoding is higher than that of the hard decision decoding, and the probability of successful decoding is higher, which can save the number of re-reads, thus further saving the time and increasing the read rate.

Figure 8:
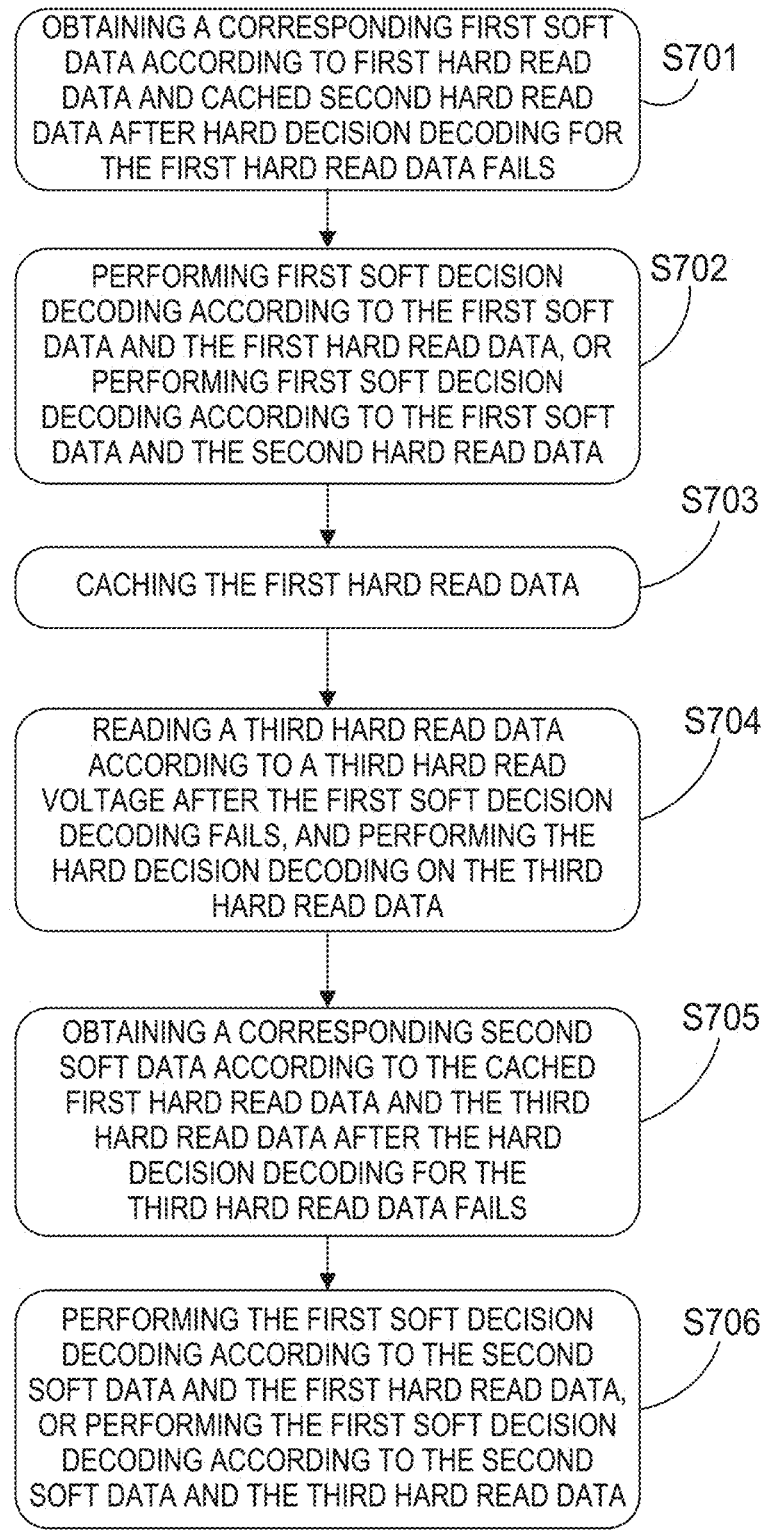
FIG. 8 is a flow diagram II of an error correction method for a memory system provided by an example of the present disclosure.

In some examples, as shown in FIG. 8, the method may further comprise:

S703: caching the first hard read data;

S704: reading a third hard read data according to a third hard read voltage after the first soft decision decoding fails, and performing the hard decision decoding on the third hard read data;

S705: obtaining a corresponding second soft data according to the cached first hard read data and the third hard read data after the hard decision decoding for the third hard read data fails; and S706: performing the first soft decision decoding according to the second soft data and the first hard read data, or performing the first soft decision decoding according to the second soft data and the third hard read data, wherein the third hard read voltage is one of the plurality of re-read voltages except the first hard read voltage and the second hard read voltage.

The soft decision decoding has a higher capability than the hard decision decoding. During a practical disclosure, if a number of error bits of data read is relatively large, decoding cannot succeed only by one time of the first soft decision decoding. Therefore, the first hard read data is cached for later use. After the first soft decision fails, a re-read is performed using the third hard read voltage to read the third hard read data; thereafter, hard decision decoding is performed on the third hard read data; and a first soft decision decoding is added after the hard decision decoding for the third hard read data fails, wherein soft data used by the first soft decision decoding this time is the second soft data obtained by the XOR calculation between the third hard read data and the cached first hard read data.

During the practical disclosure, the method may further comprise: finishing a first stage of error correction code (ECC) error correction in one of the following cases: the hard decision decoding being successful, the first soft decision decoding being successful, or a number of retries of hard read reaching a first set threshold.

The first stage of error correction code (ECC) error correction as described here may be understood as the foregoing hard decision error correction stage including the first soft decision decoding. For example, according to the error correction method provided by the examples of the present disclosure, one soft decision decoding is added after the hard decision decoding fails during re-reading in the hard decision error correction stage, and the soft data required by the soft decision decoding is obtained using the cached hard read data. As such, the high decoding capability of the soft decision decoding is utilized to shorten the decoding time, thus reducing the read time and improving the read efficiency. When the hard decision decoding succeeds or the first soft decision decoding succeeds, not only is the first stage of ECC error correction finished, but also the whole error correction process is finished, because the read data has been corrected and is correct data. Moreover, the first stage of ECC error correction will not be performed infinitely, and will be also finished to enter a next stage of error correction or output indication information of error correction failure, etc. when the number of retries of hard read reaches the first set threshold. For example, the finish of the first stage of ECC error correction may occur in one of the following cases: the hard decision decoding being successful, the first soft decision decoding being successful, and the number of retries of hard read reaching the first set threshold. Here, the first set threshold may be determined by a designer according to actual situations.

For foregoing operation 702, for whether the first hard read data or the second hard read data is selected for the first soft decision decoding together with the first soft data, in some examples, as shown in FIG. 9, the method may further comprise:

S7021: selecting, according to a first number of error bits included in the first hard read data and a second number of error bits included in the second hard read data, whether to perform the first soft decision decoding according to the first soft data and the first hard read data or to perform the first soft decision decoding according to the first soft data and the second hard read data.

For example, it is selected whether to perform the first soft decision decoding according to the first soft data and the first hard read data or to perform the first soft decision decoding according to the first soft data and the second hard read data, according to the numbers of error bits respectively included in the first hard read data and the second hard read data. In an example, when the first number is greater than the second number, it is selected to perform the first soft decision decoding according to the first soft data and the second hard read data; when the first number is less than the second number, it is selected to perform the first soft decision decoding according to the first soft data and the first hard read data; when the first number is equal to the second number, it is selected to perform the first soft decision decoding according to the first soft data and the first hard read data or to perform the first soft decision decoding according to the first soft data and the second hard read data. This is because the more the number of error bits included in the hard read data is, the lower the probability that they are corrected is. Thus, during the first soft decision decoding, the hard read data including the smaller number of error bits is to be selected as reference read data of the first soft decision decoding. Information input by the soft decision decoding to a next stage decoder may be a log-likelihood ratio (LLR), e.g., so-called soft data. The soft data is probability information of the reliability of different decisions, which is used to measure the reliability of the decisions. Thus, there is necessarily a read data as a reference, and the soft data measures its reliability.

Figure 10:
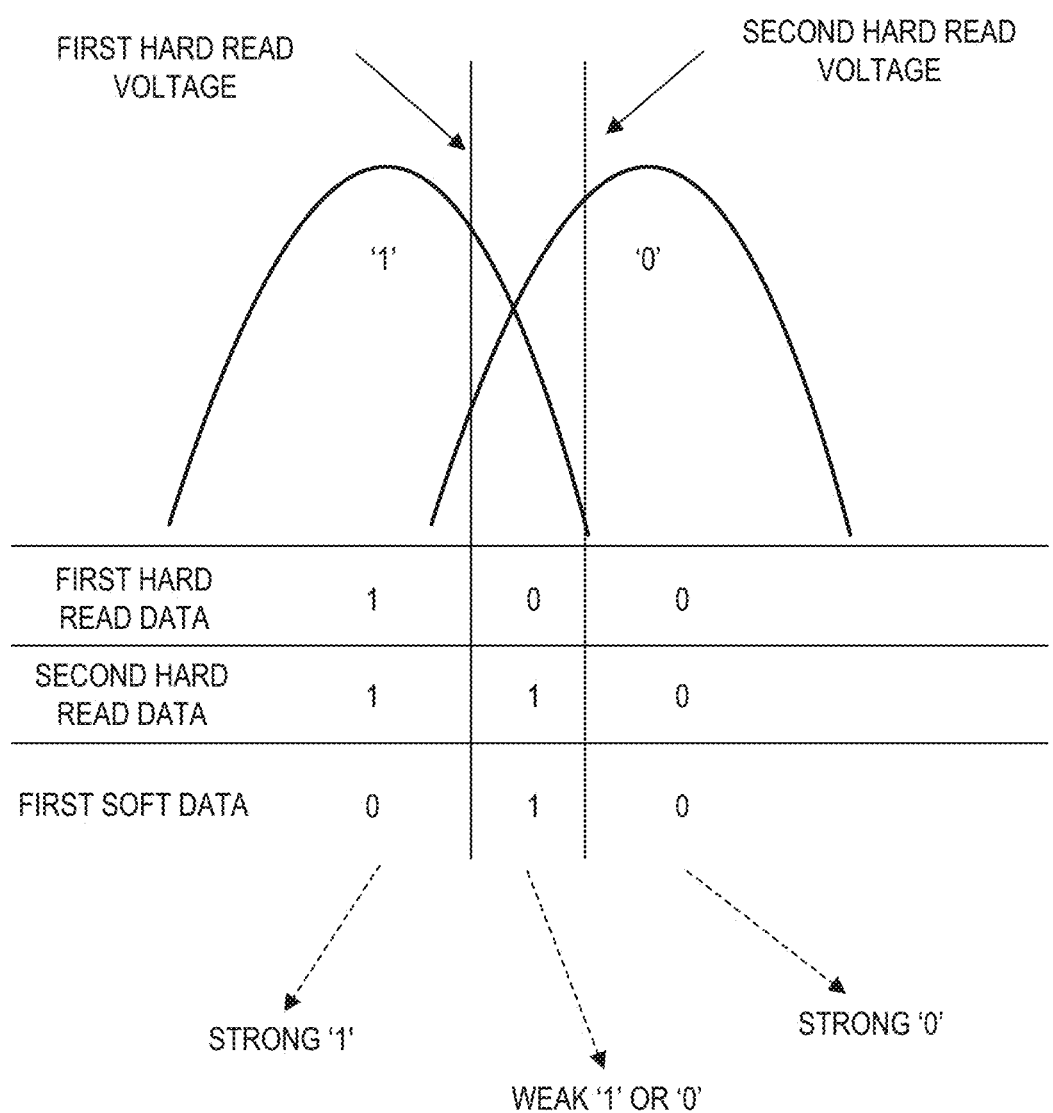
FIG. 10 is an example schematic diagram of soft decision decoding provided by an example of the present disclosure.

Refer to FIG. 10 for the understanding of the soft decision decoding. In FIG. 10, assuming that the first hard read data read using the first hard read voltage is 100, and the second hard read data read using the hard read voltage is 110, the first soft data is 010 accordingly. In this example, if the first hard read data is used as reference read data, then a bit of "0" in the first soft data represents that the reliability of this bit in the first hard read data is relatively high. In other words, this bit is decided to be relatively close to reality. For example, in FIG. 10, taking the first hard read data as the reference read data, its left-most bit is "1", and a number in the first soft data corresponding to the bit is "0", such that the reliability of the bit is relatively high, e.g., strong "1". By analogy, a number of the first soft data corresponding to a middle bit in the first hard read data is "1", then the reliability of the middle bit is weak, e.g., weak '1' or '0'; and the right-most bit in the first hard read data is strong "0". When taking the second hard read data as the reference read data, the analysis is similar, which is not repeated. Regarding whether the first hard read data or the second hard read data is selected, the foregoing description has described how to select, and implementations are also given subsequently.

Figure 11:
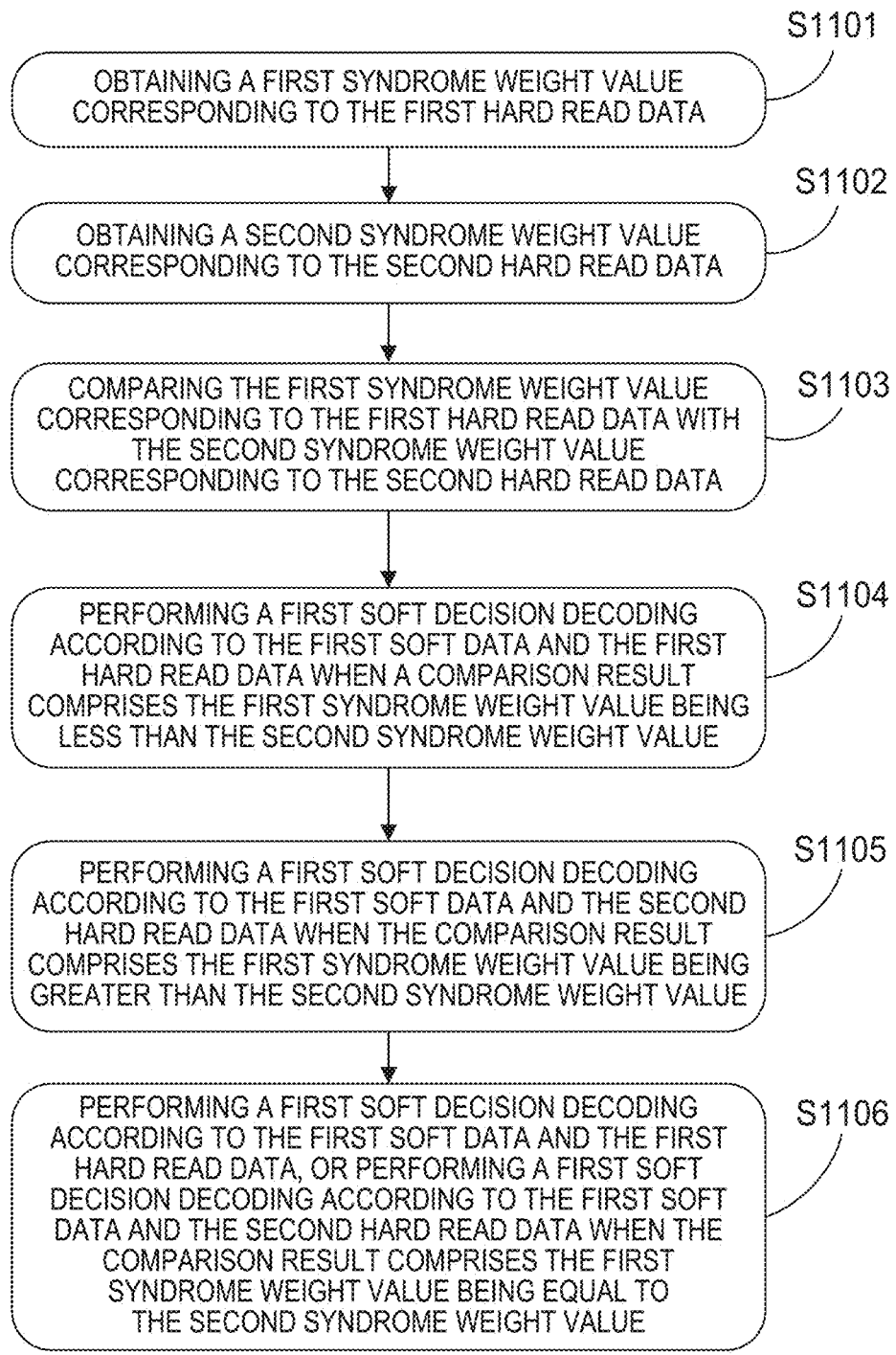
FIG. 11 is a flow diagram IV of an error correction method for a memory system provided by an example of the present disclosure.

During a practical disclosure, a number of error bits included in hard read data is measured using a syndrome weight value, and the greater the syndrome weight value is, the more the number of error bits included in the hard read data is. As shown in FIG. 11, the selecting, according to a first number of error bits included in the first hard read data and a second number of error bits included in the second hard read data, whether to perform the first soft decision decoding according to the first soft data and the first hard read data or to perform the first soft decision decoding according to the first soft data and the second hard read data may comprise:

S1101: obtaining a first syndrome weight value corresponding to the first hard read data;

S1102: obtaining a second syndrome weight value corresponding to the second hard read data;

S1103: comparing the first syndrome weight value corresponding to the first hard read data with the second syndrome weight value corresponding to the second hard read data;

S1104: performing a first soft decision decoding according to the first soft data and the first hard read data when a comparison result comprises the first syndrome weight value being less than the second syndrome weight value;

S1105: performing a first soft decision decoding according to the first soft data and the second hard read data when the comparison result comprises the first syndrome weight value being greater than the second syndrome weight value; and S1106: performing a first soft decision decoding according to the first soft data and the first hard read data, or performing a first soft decision decoding according to the first soft data and the second hard read data when the comparison result comprises the first syndrome weight value being equal to the second syndrome weight value.

The number of error bits included in the hard read data may be measured using the syndrome weight value, wherein the greater the syndrome weight value is, the more the number of error bits included in the hard read data is. In some examples, the syndrome weight value corresponding to the hard read data may be assigned to the obtained hard read data by the memory controller when the hard read data is obtained. The more the error bits included in the hard read data is, the greater the assigned value is. In some examples, a mapping relationship table of the error bits and the syndrome weight values may be prestored in the memory controller. When the hard read data is obtained, the number of the error bits included therein is counted, and then, the assignment is performed according to the mapping relationship table. For example, a method of obtaining the first syndrome weight value corresponding to the first hard read data and obtaining the second syndrome weight value corresponding to the second hard read data as described above may reference the assignment using the mapping relationship table as described earlier. Dynamic assignment is also possible. For example, the syndrome weight value corresponding to the first obtained hard read data is assigned randomly, and thereafter, the numbers of error bits included in the second obtained hard read data and the first obtained hard read data are compared. If the number of error bits of the second obtained hard read data is greater than the number of error bits included in the first obtained hard read data, an assignment of the syndrome weight value corresponding to the second obtained hard read data is greater than the random assignment. On the contrary, if the number of error bits of the second obtained hard read data is less than the number of error bits included in the first obtained hard read data, the assignment of the syndrome weight value corresponding to the second obtained hard read data is less than the random assignment. If the number of error bits of the second obtained hard read data is equal to the number of error bits included in the first obtained hard read data, the assignment of the syndrome weight value corresponding to the second obtained hard read data is equal to the random assignment. Thereafter, when a syndrome weight value of a hard read data obtained later is assigned, comparison with the numbers of error bits included in each hard read data earlier is needed, and then the assignment is performed according to the comparison result.

Here, the first syndrome weight value corresponding to the first hard read data and the second syndrome weight value corresponding to the second hard read data are obtained; thereafter, the first syndrome weight value corresponding to the first hard read data is compared with the second syndrome weight value corresponding to the second hard read data, and it is selected whether to perform the first soft decision decoding according to the first soft data and the first hard read data or to perform the first soft decision decoding according to the first soft data and the second hard read data according to the comparison result. In an example, when the comparison result comprises the first syndrome weight value being less than the second syndrome weight value, the first soft decision decoding is performed according to the first soft data and the first hard read data; when the comparison result comprises the first syndrome weight value being greater than the second syndrome weight value, the first soft decision decoding is performed according to the first soft data and the second hard read data; and when the comparison result comprises the first syndrome weight value being equal to the second syndrome weight value, the first soft decision decoding is performed according to the first soft data and the first hard read data, or the first soft decision decoding is performed according to the first soft data and the second hard read data.

To save a storage space of a memory of a memory controller, in some examples, the method may further comprise: deleting the cached second hard read data after performing a first soft decision decoding according to the first soft data and the first hard read data or performing a first soft decision decoding according to the first soft data and the second hard read data; and deleting the cached first hard read data after performing the first soft decision decoding according to the second soft data and the first hard read data or performing the first soft decision decoding according to the second soft data and the third hard read data.

For example, the hard read data not required to be used subsequently is deleted to save the memory space.

In some examples, the method may further comprise: performing a second stage of ECC error correction after the first stage of ECC error correction fails, wherein: the second stage of ECC error correction comprises: performing at least one second soft decision decoding.

In some examples, performing the second soft decision decoding comprises: determining a group of soft read voltages, wherein the group of soft read voltages include an optimal read voltage and a plurality of soft re-read voltages with a certain offset relative to the optimal read voltage; reading a fourth hard read data and a third soft data according to a soft read voltage of the group of soft read voltages, and performing the second soft decision decoding according to the fourth hard read data and the third soft data; and finishing the second stage of ECC error correction in one of the following cases: the second soft decision decoding being successful, or a number of retries of soft read reaching a second set threshold.

After the first stage of ECC error correction fails, there may be other error correction measures, such as, at least one the second soft decision decoding. Here, algorithms of the second soft decision decoding and the aforementioned first soft decision decoding may be the same or different. For example, the first soft decision decoding and the second soft decision decoding may be a belief propagation algorithm; alternatively, the first soft decision decoding is the belief propagation algorithm, and the second soft decision decoding is a minimum sum algorithm. Regardless of whether the algorithms of the first soft decision decoding and the second soft decision decoding are the same, the biggest difference between the two lies in that the soft data and the reference read data used are different. In an example, the first soft data used by the first soft decision decoding is obtained according to logic operation of the cached hard read data, while the third soft data used by the second soft decision decoding is data read from the memory according to the set soft read voltage. For example, the third soft data is data fed back by the memory to the memory controller in response to the soft read voltage applied by the memory controller, rather than being obtained by calculation using the cached hard read data in the memory controller. Moreover, the reference read data used by the first soft decision decoding is one of the cached hard read data, while the reference read data used by the second soft decision decoding is data read from the memory according to the aforementioned optimal read voltage.

Performing the at least one the second soft decision decoding as described above is also for the purpose of increasing a probability of reading the data correctly. Performing the second soft decision decoding each time may comprise the following operations: determining a group of soft read voltages that may include an optimal read voltage and a plurality of soft re-read voltages with a certain offset relative to the optimal read voltage, wherein the optimal read voltage may be obtained according to the aforementioned RRT table. In an example, the RRT table may be traversed to obtain an optimal voltage offset; then the optimal voltage offset is superposed with the reference voltage to form the optimal read voltage; and at the optimal read voltage, a number of error bits included in the obtained reference read data is least. In some examples, a voltage interval between the soft read voltages of the group of soft read voltages may be the same as a voltage interval between hard read voltages of a group of hard read voltages used by the hard decision decoding, wherein the group of hard read voltages include the initial read voltage and the plurality of re-read voltages. In some other examples, the voltage interval between the soft read voltages of the group of soft read voltages may be also different from the voltage interval between the hard read voltages of the group of hard read voltages. How to perform the soft decision decoding has been described above, which is not repeated here.

The second stage of ECC error correction is finished in one of the following cases: the second soft decision decoding being successful, and the number of retries of soft read reaching the second set threshold. The second preset threshold is also set artificially according to actual situations, and may be the same as or different from the first set threshold. Here, the number of retries of soft read may be a number of times of performing the second soft decision decoding.

In some examples, the method may further comprise: performing a third stage of redundant array of independent NAND (RAIN) error correction after the second stage of ECC error correction fails.

In some examples, the method may further comprise: outputting indication information for characterizing error correction failure after the third stage of RAIN error correction fails.

In some examples, the method further comprises: outputting read data successfully corrected in one of the following cases: the first stage of ECC error correction being successful, the second stage of ECC error correction being successful, or the third stage of RAIN error correction being successful.

In extreme cases, after both the first stage of ECC error correction and the second stage of ECC error correction fail, the third stage of redundant array of independent NAND (RAIN) error correction may be further enabled. If the third stage of redundant array of independent NAND (RAIN) error correction still fails, the indication information for characterizing the error correction failure is output, and the indication information may be one of a sound, an image, a character, a symbol and any combination thereof. The read data successfully corrected is output in one of the following cases: the first stage of ECC error correction being successful, the second stage of ECC error correction being successful, or the third stage of RAIN error correction being successful. That is, regardless of the stage, when the error correction succeeds, the read data successfully corrected may be output.

Figure 12:
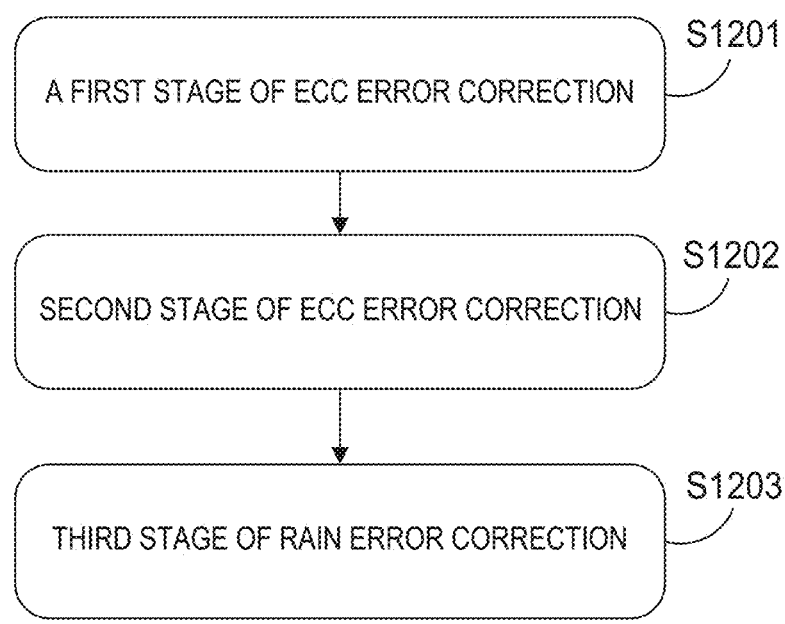
FIG. 12 is a flow diagram V of an error correction method for a memory system provided by an example of the present disclosure.

To understand the present disclosure, as shown in FIG. 12, it shows a schematic diagram of an error correction flow of a memory system provided by examples of the present disclosure.

The flow comprises:

S1201: a first stage of ECC error correction.

Figure 13:
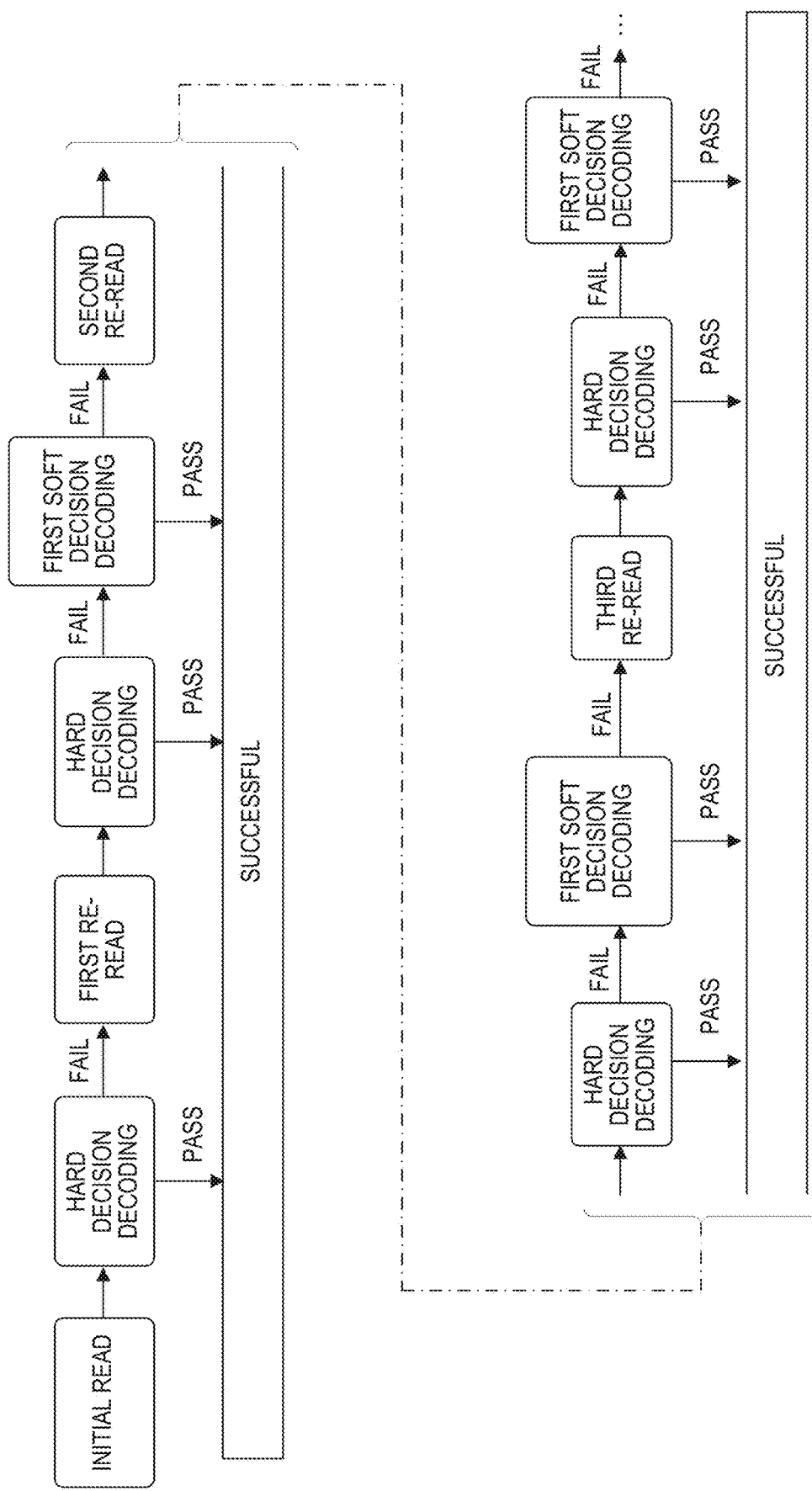
FIG. 13 is a flow diagram of ECC error correction of a first stage of an error correction method provided by an example of the present disclosure.

As shown in FIG. 13, the first stage of ECC error correction comprises: initial read; hard decision decoding of initial read data; performing a first re-read and hard decision decoding when the initial read fails; performing a first first soft decision decoding when the first re-read fails, and so on, and performing next decoding when a decoding fails. The first stage of ECC error correction is finished in one of the following cases: the number of re-reads reaching a first set threshold, the hard decision decoding being successful, or the first soft decision decoding being successful.

S1202: second stage of ECC error correction.

The second stage of ECC error correction comprises: at least one second soft decision decoding. The similarity and difference from the first soft decision has been described in detail above, which is not repeated here.

S1203: third stage of RAIN error correction.

After the third stage of RAIN error correction fails, indication information for characterizing error correction failure is output; and when the third stage of RAIN error correction succeeds, a read data successfully corrected is output.

According the error correction method provided by the examples of the present disclosure, by adding one soft decision decoding after the hard decision decoding of each time of re-read fails during the first stage of ECC error correction (the hard decision error correction), the high decoding capability of the soft decision decoding is utilized to accelerate an error correction progress, thus improving the read efficiency.

Figure 14:
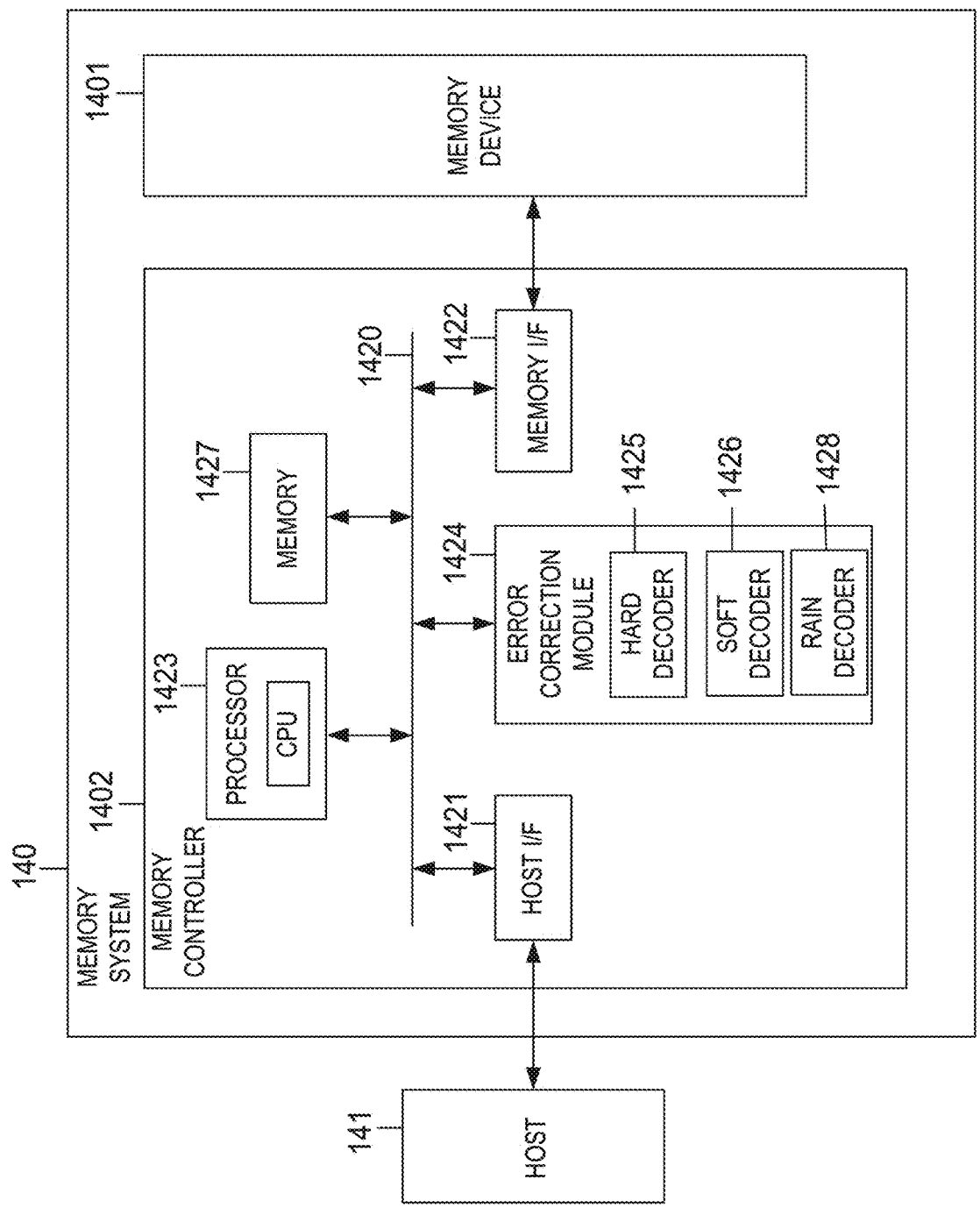
FIG. 14 is a schematic structure diagram of a memory system provided by an example of the present disclosure.

Based on the aforementioned inventive concept, examples of the present disclosure further provide a memory system. Referring to FIG. 14, FIG. 14 shows a structure block diagram of a memory system. The memory system 140 comprises: a memory device 1401 configured to store data; a memory controller 1402 coupled with the memory device and configured to: obtain a corresponding first soft data according to first hard read data and cached second hard read data after hard decision decoding for the first hard read data fails, wherein the first hard read data is read by the memory system according to a first hard read voltage, and the second hard read data is read by the memory system according to a second hard read voltage before reading the first hard read data; perform first soft decision decoding according to the first soft data and the first hard read data, or performing first soft decision decoding according to the first soft data and the second hard read data, wherein the first hard read voltage is one of a plurality of re-read voltages with a certain offset from an initial read voltage, and the second hard read voltage is the initial read voltage or a re-read voltage of the plurality of re-read voltages except the first hard read voltage.

In some examples, the memory controller 1402 may comprise: a processor 1423, a memory 1427, a hard decoder 1425 and a soft decoder 1426, wherein: the processor is configured to: read the first hard read data from the memory device according to the first hard read voltage; read the second hard read data according to the second hard read voltage before reading the first hard read data; and cache the second hard read data to the memory; the hard decoder is configured to: perform the hard decision decoding on the first hard read data; the processor is further configured to: obtain a corresponding first soft data according to the first hard read data and the cached second hard read data after the hard decision decoding for the first hard read data fails; send the first hard read data or the second hard read data to the soft decoder; and send the first soft data to the soft decoder; and the soft decoder is configured to: perform the first soft decision decoding according to the first soft data and the first hard read data, or perform the first soft decision decoding according to the first soft data and the second hard read data.

In some examples, the memory is further configured to cache the first hard read data; the processor is further configured to: read a third hard read data according to a third hard read voltage after the first soft decision decoding fails; the hard decoder is further configured to: perform the hard decision decoding on the third hard read data; the processor is further configured to: obtain a corresponding second soft data according to the cached first hard read data and the third hard read data after the hard decision decoding for the third hard read data fails; and the soft decoder is further configured to: perform the first soft decision decoding according to the second soft data and the first hard read data, or perform the first soft decision decoding according to the second soft data and the third hard read data.

In some examples, the processor is further configured to: determine whether one of the following cases occurs: the hard decision decoding being successful, the first soft decision decoding being successful, or a number of retries of hard read reaching a first set threshold; and if so, finish a first stage of error correction code (ECC) error correction.

In some examples, the soft decoder is further configured to: perform a second stage of ECC error correction after the first stage of ECC error correction fails, wherein the second stage of ECC error correction comprises: performing at least one second soft decision decoding; and finishing the second stage of ECC error correction in one of the following cases: the second soft decision decoding being successful, or a number of retries of soft read reaching a second set threshold.

In some examples, the memory controller further comprises: an RAIN error corrector 1428 configured to: perform a third stage of redundant array of independent NAND (RAIN) error correction after the second stage of ECC error correction fails; the processor is further configured to: output indication information for characterizing decoding failure after the third stage of RAIN error correction fails; and output read data successfully decoded in one of the following cases: the first stage of ECC error correction being successful, the second stage of ECC error correction being successful, or the third stage of RAIN error correction being successful.

The memory controller 1402 in the memory system 140 as shown in FIG. 14 is configured to control the memory device 1401 to perform various operations, such as, read-write operations. Here, the memory controller 1402 and the memory device 1401 may be coupled by any suitable means. In examples of the present disclosure, the memory device 1401 may be a semiconductor memory storing data in a non-volatile manner, such as, a NAND memory. As shown in FIG. 14, the memory system 140 is connected with a host 141 that may be an electronic apparatus such as a personal computer, and a mobile terminal, etc. A host I/F 1421 outputs a command and valid data (write data), etc. received from the host 141 to an internal bus 1420, and sends the valid data (the write data) read from the memory device 1401, and response from a control portion 1423, etc. to the host 141. The host IF 1421 includes, but is not limited to, at least one of: a Universal Serial Bus (USB), a Multi-media Card (MMC), a Peripheral Component Interconnection-Express (PCI-E or PCIe), a Small Computer System Interface (SCSI), a Serial SCSI (SAS), a Serial Advanced Technology Attachment (SATA), a Parallel Advanced Technology Attachment (PATA), a Small Computer System Interface (SCSI), Enhanced Small Disk Interface (ESDI) and Integrated Drive Electronics (IDE). In some examples, the host I/F 1421 is a component of the memory system for exchanging data with the host 108, and may be implemented by a firmware called a host interface layer (HIL).

A memory I/F 1422 controls processing of writing and reading the valid data, etc. to and from the memory device 1401 based on an indication of the control portion 1423. The control portion 1423 overall controls the memory system 140, and is, for example, a central processing unit (CPU), a micro-processing unit (MPU), etc. The control portion 1423 performs control according to a command in the case where it receives the command from the host 141 via the host I/F 1421. For example, the control portion 1423 indicates the memory I/F 1422 to write the valid data and parity check data to the memory device 1401 according to the command from the host 141. Furthermore, the control portion 1423 indicates the memory I/F 1422 to read the valid data and the parity check data from the memory device 1401 according to the command from the host 141. The memory I/F 1422 may be implemented as a component for exchanging data with the memory device 104 through a firmware called a Flash Interface Layer (FIL).

An error correction (ECC) module 1424 comprises a hard decision decoder 1425, a soft decision decoder 1426 and an RAIN decoder 1428, of which the respective functions have been described above, which is not repeated here.

A data buffer 1427 temporarily saves the valid data received from the host 141 before storing it to the memory device 1401, and temporarily saves the data read from the memory device 1401 before sending it to the host 141.

A memory 1427 may be also a work memory of the memory controller 1402 and is configured to store data for driving the memory controller 1402. In an example, when the memory controller 1402 controls the memory device 1401 in response to a request of the host 141, the memory 1427 may store a firmware driven by a processor of the control portion 1423 and data (such as, metadata) required for driving the firmware. The memory 1427 may be also a buffer memory of the memory controller 1401, and is configured to temporarily store write data transferred from the host 141 to the memory device 1401 and read data transferred from the memory device 1401 to the host 141. The memory 1427 may comprise a program memory for storing the write data and the read data, a data memory, a write buffer/cache, a read buffer/cache, a data buffer/cache and a mapping buffer/cache. The memory 1427 may be implemented using a volatile memory. The memory 1427 may be implemented using a static random access memory (SRAM), a dynamic random access memory (DRAM) or both.

Although FIG. 14 shows that the memory 1427 is included in the memory controller 1402, the present disclosure is not limited thereto. In implementations, the memory 1427 may be included outside the memory controller 1402, and the memory controller 1402 may input and output data to the memory 1427 through a separate memory interface (not shown).

Examples of the present disclosure further provide a memory controller, which may comprise: a processor, a memory, a hard decoder and a soft decoder, wherein: the processor is configured to: read first hard read data from a memory device coupled with the memory controller according to a first hard read voltage; read a second hard read data from the memory device according to a second hard read voltage before reading the first hard read data; and cache the second hard read data to the memory; the hard decoder is configured to: perform hard decision decoding on the first hard read data; the processor is further configured to: obtain a corresponding first soft data according to the first hard read data and the cached second hard read data after the hard decision decoding for the first hard read data fails; send the first hard read data or the second hard read data to the soft decoder; and send the first soft data to the soft decoder; and the soft decoder is configured to: perform the first soft decision decoding according to the first soft data and the first hard read data, or perform the first soft decision decoding according to the first soft data and the second hard read data; and the processor is further configured to: determine whether one of the following cases occurs: the hard decision decoding being successful, the first soft decision decoding being successful, or a number of retries of hard read reaching a first set threshold; and if so, finish a first stage of error correction code (ECC) error correction, wherein the first hard read voltage is one of a plurality of re-read voltages with a certain offset from an initial read voltage, and the second hard read voltage is the initial read voltage or a re-read voltage of the plurality of re-read voltages except the first hard read voltage.

The memory controller described here is included in the memory system described above. Thus, a structure of the memory controller and operations related to the error correction method provided by the examples of the present disclosure have been described above in detail, which are not repeated here.

The above descriptions are intended to be illustrative, and not limiting. For example, the above-mentioned instances (or one or more aspects thereof) may be combined with each other for use. Other examples may be used, for example, those that can be used when those of ordinary skill in the art read the above description. It will not be used to explain or limit the scope or meaning of the claims. In addition, in the above detailed description, various features may be combined together to simplify the present disclosure. This should not be construed to mean that the disclosed features that are not claimed are necessary for any claim. Instead, the subject matter of the disclosure may be less than all features of a particular disclosed example. Thus, the appended claims are hereby incorporated into the detailed description, with each claim standing on its own as a separate example, and it is expected that these examples can be combined with each other in various combinations or replacements. The scope of the present disclosure should be determined with reference to the appended claims, along with the full scope of equivalents to which such claims are entitled.

What is claimed is:

1. An error correction method for a memory system, comprising:
   obtaining a corresponding first soft data according to first hard read data and cached second hard read data after hard decision decoding for the first hard read data fails, wherein the first hard read data is read according to a first hard read voltage, and the second hard read data is read according to a second hard read voltage before reading the first hard read data; and
   performing first soft decision decoding according to the first soft data and the first hard read data, or performing first soft decision decoding according to the first soft data and the second hard read data,
   wherein the first hard read voltage is one of a plurality of re-read voltages with a certain offset from an initial read voltage, and the second hard read voltage is the initial read voltage or a re-read voltage of the plurality of re-read voltages except the first hard read voltage.

2. The error correction method of claim 1, further comprising:
   caching the first hard read data;
   reading a third hard read data according to a third hard read voltage after the first soft decision decoding fails, and performing the hard decision decoding on the third hard read data;
   obtaining a corresponding second soft data according to the cached first hard read data and the third hard read data after the hard decision decoding for the third hard read data fails; and
   performing the first soft decision decoding according to the second soft data and the first hard read data, or performing the first soft decision decoding according to the second soft data and the third hard read data,
   wherein the third hard read voltage is one of the plurality of re-read voltages except the first hard read voltage and the second hard read voltage.

3. The error correction method of claim 2, further comprising:
   finishing a first stage of error correction code (ECC) error correction if: the hard decision decoding is successful, the first soft decision decoding is successful, or a number of retries of hard read reaches a first set threshold.

4. The error correction method of claim 1, wherein the obtaining the corresponding first soft data according to the first hard read data and the cached second hard read data comprises:
   performing XOR operation on the first hard read data and the second hard read data to obtain the first soft data.

5. The error correction method of claim 1, further comprising:
   selecting, according to a first number of error bits included in the first hard read data and a second number of error bits included in the second hard read data, whether to perform the first soft decision decoding according to the first soft data and the first hard read data or to perform the first soft decision decoding according to the first soft data and the second hard read data.

6. The error correction method of claim 5, wherein a number of error bits included in hard read data is measured using a syndrome weight value, and the greater the syndrome weight value is, the more the number of error bits included in the hard read data is; and the selecting, according to a first number of error bits included in the first hard read data and a second number of error bits included in the second hard read data, whether to perform the first soft decision decoding according to the first soft data and the first hard read data or to perform the first soft decision decoding according to the first soft data and the second hard read data comprises:
   obtaining a first syndrome weight value corresponding to the first hard read data;
   obtaining a second syndrome weight value corresponding to the second hard read data;
   comparing the first syndrome weight value corresponding to the first hard read data with the second syndrome weight value corresponding to the second hard read data;
   performing a first soft decision decoding according to the first soft data and the first hard read data when a comparison result comprises the first syndrome weight value being less than the second syndrome weight value;
   performing a first soft decision decoding according to the first soft data and the second hard read data when the comparison result comprises the first syndrome weight value being greater than the second syndrome weight value; and
   performing a first soft decision decoding according to the first soft data and the first hard read data, or performing a first soft decision decoding according to the first soft data and the second hard read data when the comparison result comprises the first syndrome weight value being equal to the second syndrome weight value.

7. The error correction method of claim 2, further comprising:

deleting the cached second hard read data after performing a first soft decision decoding according to the first soft data and the first hard read data or performing a first soft decision decoding according to the first soft data and the second hard read data; and deleting the cached first hard read data after performing the first soft decision decoding according to the second soft data and the first hard read data or performing the first soft decision decoding according to the second soft data and the third hard read data.

8. The error correction method of claim 3, further comprising:
performing a second stage of ECC error correction after the first stage of ECC error correction fails, wherein:
the second stage of ECC error correction comprises: performing at least one second soft decision decoding.

9. The error correction method of claim 8, wherein performing the second soft decision decoding comprises:
determining a group of soft read voltages, wherein the group of soft read voltages include an optimal read voltage and a plurality of soft re-read voltages with a certain offset relative to the optimal read voltage; and
reading a fourth hard read data and a third soft data according to a soft read voltage of the group of soft read voltages, and performing the second soft decision decoding according to the fourth hard read data and the third soft data,
wherein the second stage of ECC error correction is finished if: the second soft decision decoding is successful, or a number of retries of soft read reaches a second set threshold.

10. The error correction method of claim 9, further comprising:
performing a third stage of redundant array of independent NAND (RAIN) error correction after the second stage of ECC error correction fails.

11. The error correction method of claim 10, further comprising:
outputting indication information for characterizing error correction failure after the third stage of RAIN error correction fails.

12. The error correction method of claim 10, further comprising:
outputting read data successfully corrected if: the first stage of ECC error correction is successful, the second stage of ECC error correction is successful, or the third stage of RAIN error correction is successful.

13. The error correction method of claim 9, wherein a voltage interval between read voltages of the group of soft read voltages is the same as a voltage interval between hard read voltages of a group of hard read voltages used by the hard decision decoding, wherein the group of hard read voltages include the initial read voltage and the plurality of re-read voltages.

14. A memory system, comprising:
a memory device configured to store data;
a memory controller coupled with the memory device and configured to:
obtain a corresponding first soft data according to first hard read data and cached second hard read data after hard decision decoding for the first hard read data fails, wherein the first hard read data is read according to a first hard read voltage, and the second hard read data is read according to a second hard read voltage before reading the first hard read data; and
perform first soft decision decoding according to the first soft data and the first hard read data, or performing first soft decision decoding according to the first soft data and the second hard read data,
wherein the first hard read voltage is one of a plurality of re-read voltages with a certain offset from an initial read voltage, and the second hard read voltage is the initial read voltage or a re-read voltage of the plurality of re-read voltages except the first hard read voltage.

15. The memory system of claim 14, wherein the memory controller comprises a processor, a memory, a hard decoder and a soft decoder, wherein:
the processor is configured to: read the first hard read data from the memory device according to the first hard read voltage; read the second hard read data according to the second hard read voltage before reading the first hard read data; and cache the second hard read data to the memory;
the hard decoder is configured to: perform the hard decision decoding on the first hard read data;
the processor is further configured to: obtain the corresponding first soft data according to the first hard read data and the cached second hard read data after the hard decision decoding for the first hard read data fails; send the first hard read data or the second hard read data to the soft decoder; and send the first soft data to the soft decoder; and
the soft decoder is configured to: perform the first soft decision decoding according to the first soft data and the first hard read data, or perform the first soft decision decoding according to the first soft data and the second hard read data.

16. The memory system of claim 15, wherein the memory is further configured to cache the first hard read data;
the processor is further configured to: read a third hard read data according to a third hard read voltage after the first soft decision decoding fails;
the hard decoder is further configured to: perform the hard decision decoding on the third hard read data;
the processor is further configured to: obtain a corresponding second soft data according to the cached first hard read data and the third hard read data after the hard decision decoding for the third hard read data fails; and
the soft decoder is further configured to: perform the first soft decision decoding according to the second soft data and the first hard read data, or perform the first soft decision decoding according to the second soft data and the third hard read data.

17. The memory system of claim 16, wherein the processor is further configured to: determine whether: the hard decision decoding is successful, the first soft decision decoding is successful, or a number of retries of hard read reaches a first set threshold; and if so, finish a first stage of error correction code (ECC) error correction.

18. The memory system of claim 17, wherein the soft decoder is further configured to: perform a second stage of ECC error correction after the first stage of ECC error correction fails, wherein the second stage of ECC error correction comprises: performing at least one second soft decision decoding; and
wherein the second stage of ECC error correction is finished if: the second soft decision decoding is successful, or a number of retries of soft read reaches a second set threshold.

19. The memory system of claim 18, wherein the memory controller further comprises: an RAIN error corrector configured to: perform a third stage of redundant array of independent NAND (RAIN) error correction after the second stage of ECC error correction fails;

the processor is further configured to: output indication information for characterizing decoding failure after the third stage of RAIN error correction fails; and output read data successfully decoded if: the first stage of ECC error correction is successful, the second stage of ECC error correction is successful, or the third stage of RAIN error correction is successful.

20. A memory controller, comprising:

a memory, a processor configured to read first hard read data from a memory device coupled with the memory controller according to a first hard read voltage; read a second hard read data from the memory device according to a second hard read voltage before reading the first hard read data; and cache the second hard read data to the memory, a hard decoder configured to perform hard decision decoding on the first hard read data, and a soft decoder, wherein:

the processor is further configured to: obtain a corresponding first soft data according to the first hard read data and the cached second hard read data after the hard decision decoding for the first hard read data fails; send the first hard read data or the second hard read data to the soft decoder; and send the first soft data to the soft decoder;

the soft decoder is configured to: perform a first soft decision decoding according to the first soft data and the first hard read data, or perform the first soft decision decoding according to the first soft data and the second hard read data;

the processor is further configured to: determine whether: the hard decision decoding is successful, the first soft decision decoding is successful, or a number of retries of hard read reaches a first set threshold, and if so, finish a first stage of error correction code (ECC) error correction; and the first hard read voltage is one of a plurality of re-read voltages with a certain offset from an initial read voltage, and the second hard read voltage is the initial read voltage or a re-read voltage of the plurality of re-read voltages except the first hard read voltage.

\* \* \* \* \*